United States Patent
Krishnaprasad et al.

(10) Patent No.: US 11,099,747 B2
(45) Date of Patent: *Aug. 24, 2021

(54) HIERARCHICAL SCALE UNIT VALUES FOR STORING INSTANCES OF DATA

(71) Applicant: Microsoft Technology Licensing, LLC, Redmond, WA (US)

(72) Inventors: Muralidhar Krishnaprasad, Redmond, WA (US); Radhakrishnan Srikanth, Sammamish, WA (US); Lu Xun, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1365 days.

This patent is subject to a terminal disclaimer.

(21) Appl. No.: 15/136,892

(22) Filed: Apr. 23, 2016

(65) Prior Publication Data

US 2016/0239229 A1    Aug. 18, 2016

Related U.S. Application Data

(63) Continuation of application No. 12/503,994, filed on Jul. 16, 2009, now Pat. No. 9,325,802.

(51) Int. Cl.
*G06F 3/06* (2006.01)
*G06F 16/182* (2019.01)
(Continued)

(52) U.S. Cl.
CPC ............ *G06F 3/0619* (2013.01); *G06F 3/065* (2013.01); *G06F 3/067* (2013.01); *G06F 3/0611* (2013.01);
(Continued)

(58) Field of Classification Search
CPC .. G06F 16/182; G06F 16/955; G06F 16/2228; G06F 16/951; G06F 11/2094;
(Continued)

(56) References Cited

U.S. PATENT DOCUMENTS 5,471,617 A    11/1995  Farrand et al.
5,636,371 A    6/1997  Yu
(Continued)

OTHER PUBLICATIONS

Wu et al., "LSM-trie: An LSM-tree-based Ultra-Large Key-Value Store for Small Data" Jul. 2005, USENIX.*
(Continued)

*Primary Examiner* — Irete F Ehichioya
*Assistant Examiner* — Huen Wong
(74) *Attorney, Agent, or Firm* — Wade IP Law PLLC

(57) ABSTRACT

Techniques are described herein for storing instances of data among nodes of a distributed store based on hierarchical scale unit values. Hierarchical scale unit values are assigned to the respective nodes of the distributed store. A first instance (e.g., a primary instance) of a data module is stored in a first node having a first hierarchical scale unit value. A primary instance of the data module with respect to a data operation is an instance of the data module at which the data operation with respect to the data module is initiated or initially directed. A second instance (e.g., a primary or secondary instance) of the data module is stored in a second node having a second hierarchical scale unit value based on a magnitude of a difference between the first hierarchical scale unit value and the second hierarchical scale unit value. A secondary instance is essentially a "back-up" instance.

23 Claims, 14 Drawing Sheets

(51) Int. Cl.
*G06F 16/951* (2019.01)
*G06F 16/955* (2019.01)
*G06F 16/22* (2019.01)
*G06F 11/20* (2006.01)
*G06F 11/14* (2006.01)
*G06F 12/0811* (2016.01)
*G06F 12/0813* (2016.01)
*H04L 29/08* (2006.01)

(52) U.S. Cl.
CPC ...... *G06F 11/1471* (2013.01); *G06F 11/2094* (2013.01); *G06F 12/0811* (2013.01); *G06F 12/0813* (2013.01); *G06F 16/182* (2019.01); *G06F 16/2228* (2019.01); *G06F 16/951* (2019.01); *G06F 16/955* (2019.01); *H04L 67/2842* (2013.01); *G06F 2212/154* (2013.01); *G06F 2212/62* (2013.01)

(58) Field of Classification Search
CPC ........ G06F 3/0619; G06F 3/065; G06F 3/067; G06F 3/0611; G06F 12/0811; G06F 2212/62; G06F 2212/154
USPC .................................. 707/797, 626, 639, 798
See application file for complete search history.

(56) References Cited

U.S. PATENT DOCUMENTS

| | | | |
|---|---|---|---|
| 6,105,053 A | | 8/2000 | Kimmel et al. |
| 6,151,679 A | | 11/2000 | Friedman et al. |
| 6,167,427 A | * | 12/2000 | Rabinovich ......... H04L 67/1002 707/999.202 |
| 6,182,141 B1 | | 1/2001 | Blum et al. |
| 6,519,614 B1 | * | 2/2003 | Kanai ..................... G06F 9/466 |
| 6,606,643 B1 | * | 8/2003 | Emens .................... H04L 29/06 709/200 |
| 6,963,914 B1 | * | 11/2005 | Breitbart ............. H04L 67/1095 709/225 |
| 7,080,277 B2 | | 7/2006 | Anna et al. |
| 7,325,097 B1 | | 1/2008 | Darcy |
| 2002/0026471 A1 | | 2/2002 | Bent et al. |
| 2002/0144156 A1 | | 10/2002 | Copeland, III |
| 2002/0168959 A1 | | 11/2002 | Noguchi et al. |
| 2002/0184403 A1 | | 12/2002 | Dahlin et al. |
| 2004/0088331 A1 | * | 5/2004 | Therrien ............. G06F 11/1448 |
| 2004/0148279 A1 | | 7/2004 | Peleg |
| 2004/0260906 A1 | * | 12/2004 | Landin ................ G06F 12/0284 711/203 |
| 2007/0067435 A1 | | 3/2007 | Landis et al. |
| 2007/0101070 A1 | | 5/2007 | Matsunami et al. |
| 2007/0136476 A1 | | 6/2007 | Rubinstein |
| 2007/0214314 A1 | | 9/2007 | Reuter |
| 2008/0016286 A1 | | 1/2008 | Temple |
| 2008/0172679 A1 | * | 7/2008 | Shen ...................... H04L 69/40 719/318 |
| 2009/0177697 A1 | * | 7/2009 | Gao .................. G06F 16/24539 |
| 2013/0332608 A1 | * | 12/2013 | Shiga ................... G06F 9/5088 709/226 |

OTHER PUBLICATIONS

"Final Office Action Issued in U.S. Appl. No. 12/503,994", dated Mar. 15, 2012, 17 Pages.
"Final Office Action Issued in U.S. Appl. No. 12/503,994", dated Dec. 3, 2012, 24 Pages.
"Final Office Action Issued in U.S. Appl. No. 12/503,994", dated Sep. 26, 2013, 25 Pages.
"Final Office Action Issued in U.S. Appl. No. 12/503,994", dated Jul. 7, 2015, 23 Pages.
"Non-final Office Action Issued in U.S. Appl. No. 12/503,994", dated Dec. 15, 2014, 25 Pages.
"Non-final Office Action Issued in U.S. Appl. No. 12/503,994", dated Jun. 7, 2013, 29 Pages.
"Non-final Office Action Issued in U.S. Appl. No. 12/503,994", dated Aug. 1, 2012, 20 Pages.
"Non-final Office Action Issued in U.S. Appl. No. 12/503,994", dated Nov. 25, 2011, 15 Pages.
"Notice of Allowance Issued in U.S. Appl. No. 12/503,994", dated Dec. 21, 2015, 8 Pages.
Al-Fares, et al., "A Scalable, Commodity Data Center Network Architecture", in Proceedings of the ACM SIGCOMM 2008 conference on Data communication, Aug. 17, 2008, pp. 63-74.
Harnik, et al., "Low Power Mode in Cloud Storage Systems", in proceedings of IEEE International Symposium on Parallel & Distributed Processing, May 23, 2009, 10 Pages.
Pucciani, Gianni, "The Replica Consistency Problem in Data Grids", in Thesis for the degree of Doctor of Philosophy in Information Engineering, Department of Information Engineering, University of Pisa, Feb. 1, 2008, 220 Pages.

* cited by examiner

HIERARCHICAL SCALE UNIT VALUES FOR STORING INSTANCES OF DATA

CROSS-REFERENCE TO RELATED APPLICATIONS

This application is a continuation of U.S. patent application Ser. No. 12/503,994, entitled "HIERARCHICAL SCALE UNIT VALUES FOR STORING INSTANCES OF DATA AMONG NODES OF A DISTRIBUTED STORE," filed Jul. 16, 2009, which is incorporated herein by reference in its entirety.

BACKGROUND

A distributed store is a storage system in which data is stored on multiple machines (e.g., computers or other processing systems). The multiple machines may include multiple respective nodes among which multiple instances of data may be stored to provide "high availability" of the data. For example, a distributed store may be a distributed cache, a distributed database (e.g., a distributed SQL database), or other suitable type of distributed storage system.

Data operations with respect to data in a distributed store are usually initiated at or initially directed to one instance of the data, which is referred to as the primary instance of the data. Examples of data operations include but are not limited to a read operation, a write operation, an eviction operation, a notification operation, etc. For example, an instance of data to which a read (or write) operation is initially directed with respect to the data is the primary instance of the data with respect to that read (or write) operation. In another example, an instance of data at which an eviction (or notification) operation is initiated with respect to the data is the primary instance of the data with respect to that eviction (or notification) operation. Instances of data with respect to a data operation that are not primary instances with respect to the data operation are referred to as secondary instances with respect to the data operation. Placement of the various instances of data among the nodes of the distributed store can sometimes result in the primary instance of the data and one or more of the secondary instances of the data being included in the same "scale unit" (a.k.a. unit of failure).

A scale unit is an entity in an information technology (IT) infrastructure with respect to which data failures may be determined, upgrades may be performed, latency issues may be addressed, etc. A data failure may be a loss of an instance of data, an inability to access an instance of data, etc. For example, a scale unit traditionally is defined at a machine, pod, or rack boundary by an administrator who manages the infrastructure. A pod is a physical structure on which machines may be stored. A rack is a grouping of pods within a data center, for example. Accordingly, nodes that are included in the same scale unit traditionally are assigned a common scale unit value. Scale units may be defined (and respective values may be assigned) using a configuration file, an automated process, or other suitable technique. Conventional techniques for assigning scale unit values are relatively inflexible, and conventional data storing techniques may provide relatively little protection against loss of access to data even when multiple instances of the data are included in the distributed store. For example, if all instances of the data are included in a single entity within the IT infrastructure, a data failure with respect to that entity may result in loss of access to the data.

SUMMARY

Various approaches are described herein for, among other things, storing instances of data among nodes of a distributed store based on hierarchical scale unit values. The nodes of the distributed store are hosted by machines (e.g., computers or other processing systems). Each node includes data module(s) of the distributed store. A data module is a respective portion (e.g., partition(s) or other suitable portion) of the distributed store or a replica of the distributed store. It should be noted that any portion of the distributed store may be replicated across multiple nodes. For example, a first instance of a portion may be included in a first node, a second instance of the portion may be included in a second node, and so on. Moreover, a node may include multiple instances of the same portion of the distributed store. A "replica of the distributed store", however, refers to an instance of all data stored in the distributed store. The distributed store may be implemented in a networked environment or in absence of a network. For instance, the distributed store may be implemented in a cloud of a cloud computing environment.

A hierarchical scale unit is an entity (e.g., a node, a virtual machine, a machine, etc.) in a hierarchical information technology (IT) infrastructure that stores a distributed store. The hierarchical IT infrastructure includes a plurality of levels and may have any suitable configuration. In one example configuration, nodes of the distributed store are hosted on respective virtual machines, which are executed on respective machines. The nodes of the distributed store may correspond to a first level of the hierarchical IT infrastructure, the virtual machines may correspond to a second level of the infrastructure, and the machines may correspond to a third level of the infrastructure. The machines can be located on respective pods, which may correspond to a fourth level of the infrastructure. The pods can be grouped into respective racks, which may correspond to a fifth level of the infrastructure. The racks can be grouped into respective data centers, which may correspond to a sixth level of the infrastructure, and so on. The example hierarchical IT infrastructure levels described herein are provided for illustrative purposes and are not intended to be limiting. For instance, the hierarchical IT infrastructure may not include one or more of the example levels discussed herein. Moreover, the hierarchical IT infrastructure may include level(s) in addition to or in lieu of one or more of the example levels discussed herein.

A hierarchical scale unit value is a value (e.g., number, character string, etc.) that is assigned to a hierarchical scale unit of the hierarchical IT infrastructure. The hierarchical scale unit value that is assigned to a hierarchical scale unit corresponds to that hierarchical scale unit and each of the hierarchical scale units in other respective levels of the hierarchical IT infrastructure that include that hierarchical scale unit. For example, a hierarchical scale unit that is assigned to a node may correspond to that node, a machine on which the node is stored, a data center that includes the machine, etc. Such hierarchical scale unit values may be used to store instances of data among hierarchical scale units of the distributed store based on a magnitude of a difference between respective hierarchical scale unit values.

A data manager is at least one computer or other processing system(s), including one or more processors, which distributes instances of data modules of a distributed store among nodes. In a replication scenario, multiple instances of data modules may be stored in different nodes for "high availability" of those data modules. The data manager also determines which instances of data modules are to be primary instances of the data modules with respect to data operations and which are to be secondary instances of the data modules with respect to the data operations.

A primary instance of a data module with respect to a data operation is an instance of the data module at which the data operation with respect to the data module is initially directed or at which the data operation with respect to the data module is initiated. Examples of data operations include but are not limited to a read operation, a write operation, an eviction operation, a notification operation, etc. For example, an instance of a data module to which a read (or write) operation is initially directed with respect to the data module is the primary instance of the data module with respect to that read (or write) operation. In another example, an instance of a data module at which an eviction (or notification) operation is initiated with respect to the data module is the primary instance of the data module with respect to that eviction (or notification) operation. Secondary instances of data modules with respect to data operations are essentially "back-up" instances of the data modules with respect to the data operations. It should be noted that the data manager may store multiple primary instances of a data module among the nodes. For instance, storing multiple instances of the data module may enable or facilitate scaling of the data operations with respect to the data module.

The data manager may be capable of assigning hierarchical scale unit values to respective hierarchical scale units (e.g., nodes, virtual machines, machines, etc.) of the distributed store. The data manager may be configured to determine in which nodes of the distributed store to store instances of a data module based on the hierarchical scale unit values that are assigned to the respective nodes. For instance, the data manager may store the instances of the data module based on a magnitude of a difference between the hierarchical scale unit values assigned to the respective nodes.

In an example implementation, the data manager stores a primary instance of a data module with respect to a data operation in a first node having a first hierarchical scale unit value. The data manager stores a second instance (e.g., another primary instance or a secondary instance) of the data module with respect to the data operation in a second node having a second hierarchical scale unit value based on a magnitude of a difference between the first and second hierarchical scale unit values. The data manager may store other instances of the data module with respect to the data operation in other nodes having respective hierarchical scale unit values based on a magnitude of a difference between those respective hierarchical scale unit values and hierarchical scale unit value(s) of at least one of the nodes in which an instance of the data module has been stored.

The data manager may be capable of storing a primary instance and secondary instance(s) of a data module with respect to a data operation such that the primary instance is not stored in the same node as any secondary instance. The data manager may be capable of storing secondary instances of a data module across multiple hierarchical scale unit boundaries, which may result in a relatively lower probability that the data module will become inaccessible in the event of a data failure. For instance, a data failure with respect to an entity in the hierarchical IT infrastructure may be less likely to render all instances of a data module inaccessible if the instances of the data module are stored in accordance with technique(s) described herein. In an example implementation, the hierarchical scale units may be geographically diverse, such that storing the secondary instances of the data module across hierarchical scale unit boundaries effectively stores the secondary instances across geographic boundaries.

An example method is described in which hierarchical scale unit values are assigned to respective nodes of a distributed store. A primary instance of a data module with respect to a data operation is stored in a first node having a first hierarchical scale unit value. A second instance of the data module with respect to the data operation is stored in a second node having a second hierarchical scale unit value based on a magnitude of a difference between the first hierarchical scale unit value and the second hierarchical scale unit value.

Another example method is described in which hierarchical scale unit values are assigned to respective nodes of a distributed store. A primary instance of a data module with respect to a data operation is stored in a first node having a first hierarchical scale unit value. A determination is made that a magnitude of a difference between the first hierarchical scale unit value and a second hierarchical scale unit value of a second node exceeds a magnitude of a difference between the first hierarchical scale unit value and a hierarchical scale unit value of any of the other nodes. A determination is made whether a load of the second node exceeds a threshold. If the load of the second node does not exceed the threshold, a second instance of the data module with respect to the data operation is stored in the second node. Otherwise, the second instance of the data module with respect to the data operation is stored in a third node having a third hierarchical scale unit value based on a magnitude of a difference between the first hierarchical scale unit value and the third hierarchical scale unit value.

An example data manager is described that includes an assigning module and a storing module. The assigning module is configured to assign hierarchical scale unit values to respective nodes of a distributed store. The storing module is configured to store a primary instance of a data module with respect to a data operation in a first node having a first hierarchical scale unit value. The storing module is further configured to store a second instance of the data module with respect to the data operation in a second node having a second hierarchical scale unit value based on a magnitude of a difference between the first hierarchical scale unit value and the second hierarchical scale unit value.

A computer program product is also described. The computer program product includes a computer-readable medium having computer program logic recorded thereon for enabling a processor-based system to store instances of a data module among nodes of a distributed store. The computer program product includes first, second, and third program logic modules. The first program logic module is for enabling the processor-based system to assign hierarchical weighted scale unit values to respective nodes of the distributed store. The second program logic module is for enabling the processor-based system to store a primary instance of the data module with respect to a data operation in a first node having a first hierarchical weighted scale unit value. The third program logic module is for enabling the processor-based system to store a second instance of the data module with respect to the data operation in a second node having a second hierarchical weighted scale unit value based on a magnitude of a difference between the first hierarchical weighted scale unit value and the second hierarchical weighted scale unit value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
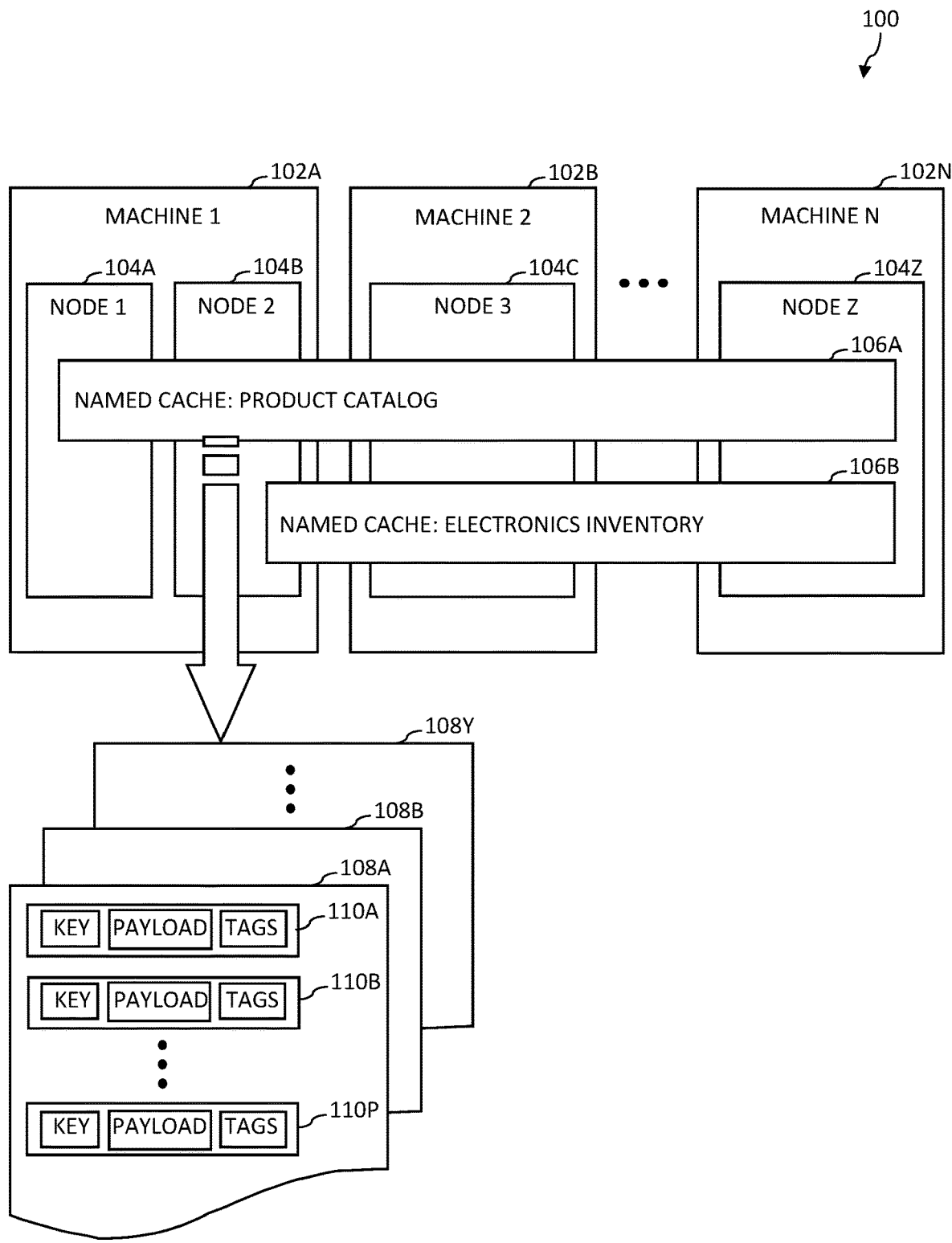
FIG. 1 is an example logical representation of a distributed cache.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The detailed description begins with an introductory section to introduce some of the concepts that will be discussed in further detail in subsequent sections. An example implementation of a distributed cache is described in the next section to provide an example context in which example embodiments may be implemented. Example embodiments for storing instances of data among nodes of a distributed store based on hierarchical scale unit values are then discussed, followed by a conclusion section.

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention. For example, FIGS. 1-5 discuss an example implementation of a distributed cache to provide an example context in which example embodiments may be implemented. However, persons skilled in the relevant art(s) will recognize that the disclosed technologies are not limited to the context of a distributed cache. Rather, the disclosed technologies are applicable to any suitable distributed store, including but not limited to a distributed cache, a distributed database (e.g., a distributed SQL database), or other suitable type of distributed storage system.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Example embodiments are capable of storing instances of data among nodes of a distributed store based on hierarchical scale unit values. The nodes of the distributed store are hosted by a plurality of machines (e.g., computers or other processing systems). Each node includes one or more data modules of the distributed store. A data module is a respective portion (e.g., partition(s) or other suitable portion) of the distributed store or a replica of the distributed store. It should be noted that any portion of the distributed store may be replicated across multiple nodes. For example, a first instance of a portion may be included in a first node, a second instance of the portion may be included in a second node, and so on. Moreover, a node may include multiple instances of the same portion of the distributed store. A "replica of the distributed store", however, refers to an instance of all data stored in the distributed store. The distributed store may be implemented in a networked environment or in absence of a network. For instance, the distributed store may be implemented in a cloud of a cloud computing environment.

A hierarchical scale unit is an entity (e.g., a node, a virtual machine, a machine, etc.) in a hierarchical information technology (IT) infrastructure that stores a distributed store. The hierarchical IT infrastructure includes a plurality of levels and may have any suitable configuration. In one example configuration, nodes of the distributed store are hosted on respective virtual machines, which are executed on respective machines. The nodes of the distributed store may correspond to a first level of the hierarchical IT infrastructure, the virtual machines may correspond to a second level of the infrastructure, and the machines may correspond to a third level of the infrastructure. The machines can be located on respective pods, which may correspond to a fourth level of the infrastructure. The pods can be grouped into respective racks, which may correspond to a fifth level of the infrastructure. The racks can be grouped into respective data centers, which may correspond to a sixth level of the infrastructure, and so on. In accordance with this example configuration, a hierarchical scale unit may be a node in the first level of the hierarchical IT infrastructure, a virtual machine in the second level, a machine in the third level, etc.

The example hierarchical IT infrastructure levels described herein are provided for illustrative purposes and are not intended to be limiting. For instance, the hierarchical IT infrastructure may not include one or more of the example levels discussed herein. Moreover, the hierarchical IT infrastructure may include level(s) in addition to or in lieu of one or more of the example levels discussed herein.

A hierarchical scale unit value is a value (e.g., number, character string, etc.) that is assigned to a hierarchical scale unit of the hierarchical IT infrastructure. The hierarchical scale unit value that is assigned to a hierarchical scale unit corresponds to that hierarchical scale unit and each of the hierarchical scale units in other respective levels of the hierarchical IT infrastructure that include that hierarchical scale unit. In accordance with the example above, if a node of the distributed store is represented as a first node, which is included in a fifth virtual machine of a seventh machine, which is stored on a third pod of a second rack in a fourth data center, the hierarchical scale unit value of that first node may be represented as 4.2.3.7.5.1. Such hierarchical scale unit values may be used to store instances of data among the hierarchical scale units of the distributed store based on a magnitude of a difference between respective hierarchical scale unit values.

A data manager is at least one computer or other processing system(s), including one or more processors, which distributes instances of data modules of a distributed store among machines that host respective nodes. In a replication scenario, multiple instances of data modules may be stored in different nodes for "high availability" of those data modules. The data manager also determines which instances of data modules are to be primary instances of the data modules with respect to data operations and which are to be secondary instances of the data modules with respect to the data operations.

A primary instance of a data module with respect to a data operation is an instance of the data module at which the data operation with respect to the data module is initially directed or at which the data operation with respect to the data module is initiated. Examples of data operations include but are not limited to a read operation, a write operation, an eviction operation, a notification operation, etc. For example, an instance of a data module to which a read (or write) operation is initially directed with respect to the data module is the primary instance of the data module with respect to that read (or write) operation. In another example, an instance of a data module at which an eviction (or notification) operation is initiated with respect to the data module is the primary instance of the data module with respect to that eviction (or notification) operation. Secondary instances of data modules with respect to data operations are essentially "back-up" instances of the data modules with respect to the data operations. It should be noted that the data manager may store multiple primary instances of a data module among the nodes. For instance, storing multiple instances of the data module may facilitate scaling of the data operations.

In accordance with example embodiments, a data manager is capable of assigning hierarchical scale unit values to respective nodes of a distributed store. A primary instance of a data module with respect to a data operation is stored in a first node having a first hierarchical scale unit value. A second instance (e.g., another primary instance or a secondary instance) of the data module with respect to the data operation is stored in a second node having a second hierarchical scale unit value based on a magnitude of a difference between the first and second hierarchical scale unit values.

For example, the second instance may be stored in the second node based on the magnitude of difference exceeding a threshold. In another example, the second instance may be stored in the second node based on the magnitude of difference exceeding a magnitude of a difference between the first hierarchical scale unit value and a hierarchical scale unit value of any of the other nodes. In yet another example, the second instance may be stored in the second node based on the magnitude of difference exceeding a magnitude of a difference between the first hierarchical scale unit value and a hierarchical scale unit value of any of the other nodes having a load that does not exceed a threshold.

In some example embodiments, one or more of the hierarchical scale unit values may be weighted for the purpose of determining the magnitude of difference. The weights of such hierarchical scale unit values may be based on any suitable one or more factors, including but not limited to loads of the respective nodes to which the respective weighted hierarchical scale unit values are assigned, load latencies of the respective nodes to which the respective weighted hierarchical scale unit values are assigned, failure probabilities of the respective nodes to which the respective weighted hierarchical scale unit values are assigned, etc.

Example embodiments may be capable of storing a primary instance and one or more secondary instances of a data module with respect to a data operation such that the primary instance is not stored in the same node as any secondary instance. Example embodiments may be capable of storing secondary instances of a data module across multiple hierarchical scale unit boundaries, which may result in a relatively lower probability that the data module will become inaccessible in the event of a data failure. For instance, a data failure with respect to an entity in the hierarchical IT infrastructure may be less likely to render all instances of a data module inaccessible if the instances of the data module are stored in accordance with technique(s) described herein. In an example implementation, the hierarchical scale units may be geographically diverse, such that storing the secondary instances of the data module across hierarchical scale unit boundaries effectively stores the secondary instances across geographic boundaries.

II. Example Implementation of a Distributed Cache

FIG. 1 is an example logical representation of a distributed cache 100. A distributed cache is a cache in which data is stored on a plurality of machines (e.g., machines 102A-102N). A machine is a computer (e.g., server) or other processing system that is configured to support one or more nodes of a distributed cache. Each node includes one or more data modules of the distributed cache. A data module is a respective portion (e.g., partition(s) or other suitable portion) of the distributed cache or a replica of the distributed cache. It should be noted that any portion of the distributed cache may be replicated across multiple nodes. For instance, a first instance of a portion may be included in a first node, a second instance of the portion may be included in a second node, and so on. Moreover, a node may include multiple instances of the same portion of the distributed cache. A "replica of the distributed cache", however, refers to an instance of all data stored in the distributed cache.

Distributed cache 100 includes named caches 106A and 106B. A named cache is a logical grouping of data. A named cache may be thought of as a database for ease of discussion, though the scope of the example embodiments is not limited in this respect. Named caches 106A and 106B specify physical configurations and cache policies, including but not limited to failover, expiration, eviction, etc. Applications that need to communicate with a designated distributed cache (e.g., distributed cache 100) instantiate the same named cache.

An application may use one or more named caches based on the policies for the various caches. For example, a first type of data (e.g., activity data) may be stored in a named cache that is partitioned, while a second type of data (e.g., reference data) may be stored in a named cache that is replicated. Partitioned and replicated distributed caches are discussed in greater detail below.

Two named caches (i.e., named caches 106A and 106B) are shown in FIG. 1 for illustrative purposes and are not intended to be limiting. Persons skilled in the relevant art(s) will recognize that distributed cache 100 may include any number of named caches. Named cache 106A is shown to store data associated with a product catalog, and named cache 106B is shown to store data associated with an electronics inventory, though it will be recognized that named caches may store any suitable groupings of data.

Each of the nodes 104A-104Z (a.k.a. "cache hosts") includes one or more data modules of distributed cache 100. A data module is a respective portion (e.g., partition(s) or other suitable portion) of the distributed cache or a replica of the distributed cache. It should be noted that any portion of the distributed cache may be replicated across multiple nodes. For instance, a first instance of a portion may be included in a first node, a second instance of the portion may be included in a second node, and so on. Moreover, a node may include multiple instances of the same portion of the distributed cache. A "replica of the distributed cache", however, refers to an instance of all data stored in the distributed cache. Nodes 104A-104Z are referred to collectively as "the cluster."

Each of the named caches 106A and 106B includes one or more regions. A region is a logical grouping of objects in a named cache. For instance, named cache 106A is shown in FIG. 1 to include regions 108A-108Y for illustrative purposes. Accordingly, each data module among nodes 104A-104Z may include one or more respective regions of named cache 106A and/or named cache 106B. A region may be thought of as a table for ease of discussion, though the scope of the embodiments is not limited in this respect. For instance, a region may store arbitrary sets of key value pairs. A key value pair includes a key and a corresponding value. A key may be a string of characters, for example, that is used to find a location in distributed cache 100. The value is data (e.g., an object) that corresponds to the location indicated by the key. Further discussion of key value pairs is provided below with reference to FIGS. 2-5.

It should be noted that an application need not necessarily specify a region in order to access a named cache (e.g., named cache 106A or 106B). For instance, the application may use put, get, and remove application programming interfaces (APIs) using only a key to a corresponding object. In fact, the application may scale better when not using regions because key value pairs that are written by the application can be distributed across a named cache without regard for region. For example, if no region is specified during the creation and writing of key value pairs, the key value pairs may be automatically partitioned into multiple implicitly created regions, for example.

Each region 108A-108Y includes one or more cache items. As shown in FIG. 1, region 108A includes cache items 110A-110P for illustrative purposes. A cache item represents the lowest level of caching that includes the object to be cached along with other information which may include but is not limited to a key, an object payload, one or more tags, a time to live (TTL), created timestamp, a version number, other internal bookkeeping information, etc. Each of the cache items 110A-110P is shown to include a key, a payload, and tags for illustrative purposes, though it will be recognized that the example embodiments are not limited in this respect. For example, cache items 110A-110P need not necessarily include respective keys, payloads, and/or or tags. In another example, cache items 110A-110P may include information in addition to or in lieu of the keys, payloads, and/or tags shown in FIG. 1. The following is an example of C # code that shows the creation of a named cache and region:

```
//CacheFactory class provides methods to return cache objects
//Create instance of CacheFactory (reads appconfig)
CacheFactory fac = new CacheFactorc( );
//Get a named cache from the factory
Cache catalog = fac.GetCache("catalogcache");
//---------------------------------------------------------------
//Simple Get/Put
catalog.Put("toy-101", new Toy("Thomas", .,.));
//From the same or a different client
Toy toyObj = (Toy)catalog.Get("toy-101");
//---------------------------------------------------------------
//Region based Get/Put
catalog.CreateRegion("toyRegion");
//Both toy and toyparts are put in the same region
catalog.Put("toyRegion", "toy-101", new Toy( .,.));
catalog.Put("toyRegion", "toypart-100", new ToyParts(...));
Toy toyObj = (Toy)catalog.Get("toyRegion", "toy-101");
```

The example code provided above is not intended to be limiting. It will be recognized that any suitable type of code may be used to create a named cache and/or a region.

In a replication scenario, multiple instances of data modules may be stored across nodes 104A-104Z for "high availability". Each of the nodes 104A-104Z may be a primary node or a secondary node with respect to any one or more data modules of distributed cache 100. A primary node is a node that includes a primary instance of a designated data module. For instance, access to the designated data module is routed to the primary node for the designated data module. A secondary node is a node that includes a secondary instance of a designated region. For instance, if a named cache is configured to have "backup instances" of a data module for high availability, then a primary node is specified for providing access to the data module, and one or more other nodes are chosen to include one or more respective secondary instances of the data module in case the primary instance becomes inaccessible, for example. Changes that are made to the primary instance of the data module are reflected in the secondary instances. Such changes may be provided to the secondary instances synchronously or asynchronously. In the asynchronous approach, if the primary node for a data module fails, the secondary node(s) can be used to read data that is stored in the data module without having to have logs written to disk. For instance, failure of the primary node causes a secondary node to become the primary node, so that the data module remains accessible.

A node may be a primary node with respect to one or more first data modules and a secondary node with respect to one or more second data modules of the same distributed cache. For example, if the node is specified to have the primary instance of the first data module(s), the node is considered to be a primary node with respect to the first data module(s). Any other nodes that include an instance of a first data module but do not provide access to that first data module are considered to be secondary nodes with respect to that first data module. If the node does not provide access to the second data module(s), the node is considered to be a secondary node with respect to the second data module(s). A node that provides access to a second data module is considered to be a primary node with respect to that second data module.

Distributed cache 100 may be any of a variety of cache types, including but not limited to a partitioned cache, replicated cache, or local cache. It should be recognized that each of these types of distributed cache may include multiple instances of any one or more data modules. For example, a plurality of instances of a data module may be stored in a plurality of respective nodes of the distributed cache. In another example, a plurality of instances of a data module may be stored on a common node. One instance of each data module may be designated as the primary instance of the respective data module. Other instances of the data modules are designated as secondary instances of the respective data modules.

Applications may choose the appropriate type of cache based on the type of data to be cached, for example. A partitioned cache is a cache that includes regions that are partitioned among the nodes on which a named cache is defined. The combined memory of the machines across the cluster (e.g., machines 102A-102N) can be used to cache data, which may increase the amount of memory available to distributed cache 100. All data operations associated with a data partition are initiated at or initially directed to the node(s) that contain the primary instance(s) of the data partition with respect to the respective data operations.

A partitioned cache may be used to achieve a desired scale. For instance, machines and/or nodes may be added to distributed cache 100 to enable automatic load balancing to occur. For instance, some partitions that are stored among machines 102A-102N (or nodes 104A-104Z) may be migrated to the added machines and/or nodes. Such automatic load balancing may result in keys being distributed across the revised cluster. Access requests may be routed to more machines, which may result in an increased throughput. Additional machines may provide additional memory. Additional memory may enable distributed cache 100 to store more data.

Figure 2:
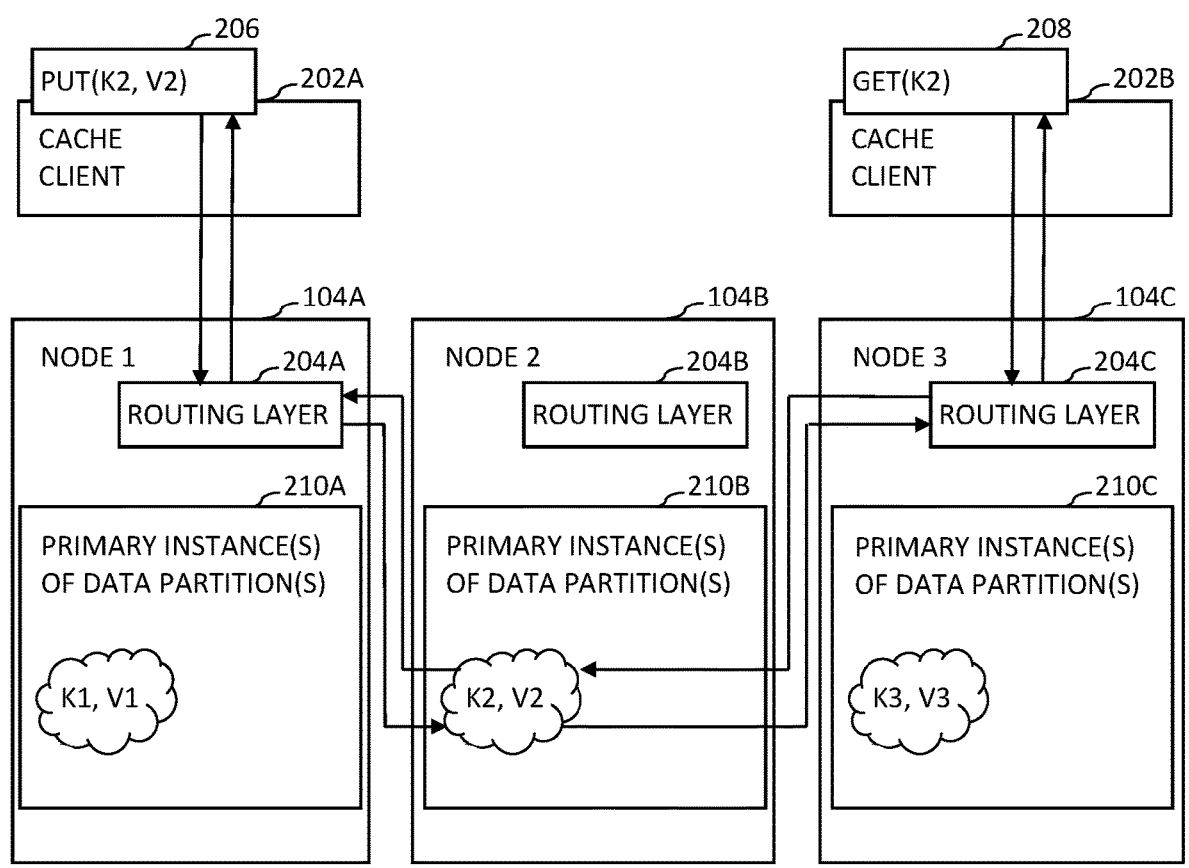
FIG. 2 is a block diagram of an example routing protocol used to route requests and responses of Put and Get operations in a partitioned distributed cache having primary data partitions with respect to a data operation.

FIG. 2 is a block diagram of an example routing protocol 200 used to route requests and responses of Put and Get operations 206, 208 in a partitioned distributed cache having primary instance(s) of data partition(s) 210A-210C with respect to a data operation. Each of primary instance(s) 210A-210C includes one or more primary instances of one or more respective data partitions. It should be noted that in the embodiment of FIG. 2 no replicas of data partitions are included in nodes 104A-104C because each of the nodes 104A-104C includes only primary instance(s) of respective data partition(s). Only one instance of a data partition can be a primary instance with respect to a given data operation at a given time. A Put operation (e.g., Put operation 206) writes data in a distributed cache (e.g., distributed cache 100). A Get operation (e.g., Get operation 208) reads data from a distributed cache (e.g., distributed cache 100). The Put and Get operations 206, 208 are performed by respective cache clients 202A, 202B.

A cache client is a software application that communicates with a node for writing and/or reading data with respect to data partitions in a distributed cache. A cache client may be configured as a simple cache client or a routing cache client. A simple cache client is a cache client that is configured to contact one node (e.g., one of nodes 104A-104C) in a cluster. The simple cache client has no routing capabilities and does not track where each cached object is stored in the distributed cache. If a simple cache client requests an object from a node that does not store the object or that is not the primary node for that object, that node retrieves the object from the cluster and then returns the object to the simple cache client. A routing client, on the other hand, is a cache client that has routing capabilities. The routing cache client includes a routing table to keep track of cached object placement across the nodes (e.g., nodes 104A-104C) in the cluster. Because the routing cache client keeps track of where each of the cached objects are, the routing cache client can make requests directly to the node that stores the object in memory.

As shown in FIG. 2, cache clients 202A and 202B are configured as simple cache clients for illustrative purposes. It will be recognized, however, that any one or more of cache clients 202A or 202B may be configured as a routing cache client. In FIG. 2, Put operation 206 assigns a value "V2" for a key "K2". A routing layer 204A of node 104A determines that the key "K2" is associated with node 104B. Accordingly, routing layer 204A routes the request that is associated with Put operation 206 to primary data partition 210B of node 104B. A routing layer 204C routes a request corresponding to Get operation 208 for the key "K2" to primary data partition 210B, as well. It should be noted that routing layers may be incorporated into cache clients. Accordingly, routing layer 204A may be incorporated into cache client 202A, and/or routing layer 204C may be incorporated into cache client 202B.

Figure 3:
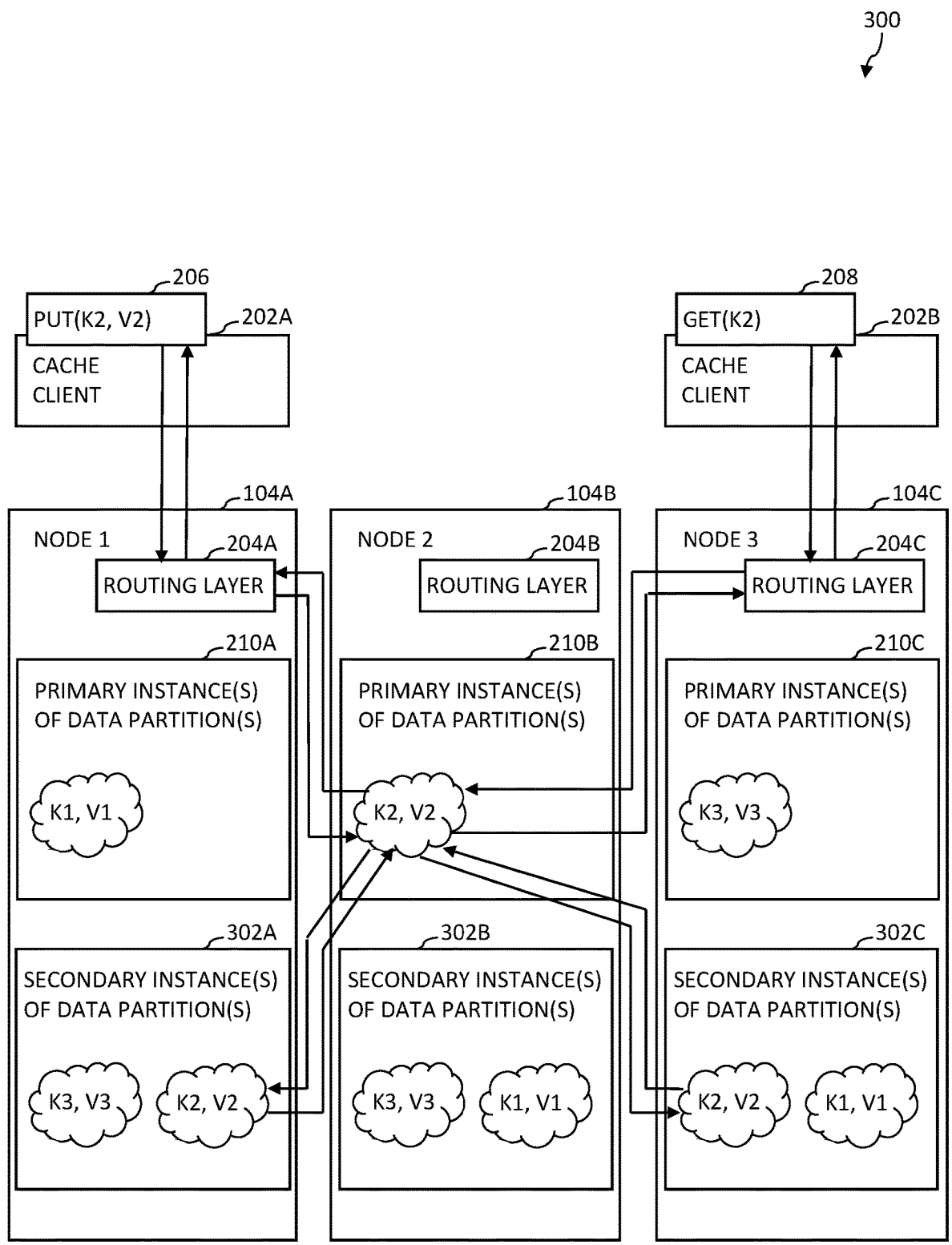
FIG. 3 is a block diagram of an example routing protocol used to route requests and responses of Put and Get operations in a partitioned distributed cache having primary and secondary data partitions with respect to a data operation.

FIG. 3 is a block diagram of an example routing protocol 300 used to route requests and responses of Put and Get operations 206, 208 in a partitioned distributed cache having primary instance(s) of data partition(s) 210A-210C and secondary instance(s) of data partition(s) 302A-302C with respect to a data operation. Data (e.g., key value pairs "K1, V1", "K2, V2", and "K3, V3") are replicated across nodes 104A-104C, though data partitions 210A-210C and 302A-302C are not replicated.

As shown in FIG. 3, cache client 202A sends a request to put the value "V2" with the key "K2" to node 104A. Routing layer 204A determines that the key "K2" belongs to node 104B and therefore routes the key "K2" to node 104B. Node 104B performs Put operation 206 locally and also sends the put request corresponding to Put operation 206 to secondary nodes 104A and 104C. Nodes 104A and 104C are deemed to be secondary nodes with respect to the key value pair "K2, V2" because nodes 104A and 104C include secondary instances of the key value pair "K2, V2." Node 104B waits for an acknowledgement from nodes 104A and 104C that the request for the key value pair "K2, V2" has been received from node 104B. Upon receiving such acknowledgement, node 104B provides an indicator acknowledging success of the Put operation to node 104A. Node 104A forwards the indicator to cache client 202A.

Get operation 208 is performed in a manner similar to that discussed above with reference to FIG. 2. For instance, routing layer 204C routes the request corresponding to Get operation 208 to primary data partition 210B, which includes the key "K2."

Figure 4:
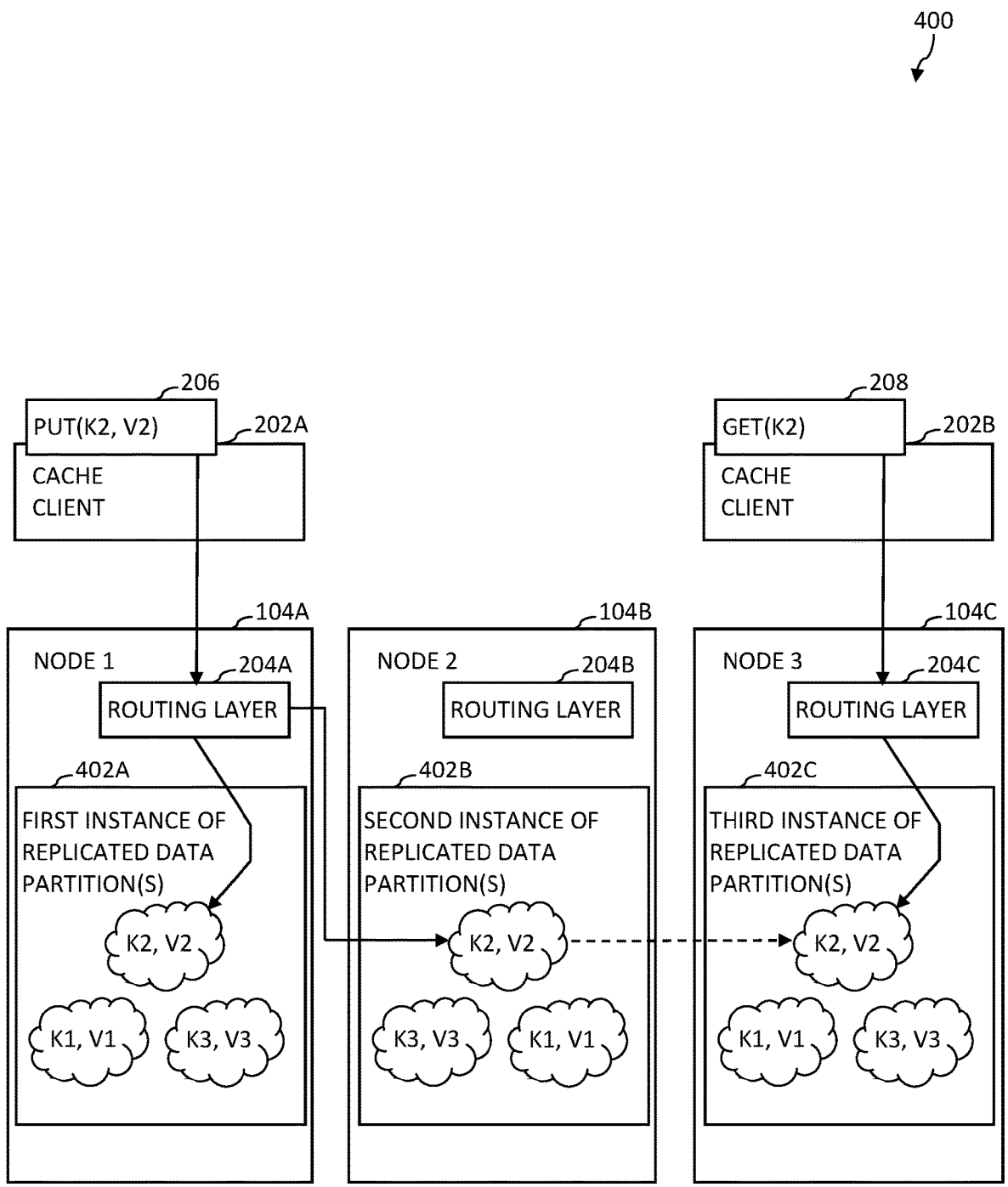
FIG. 4 is a block diagram of an example routing protocol used to route requests and responses of Put and Get operations in a replicated distributed cache.

FIG. 4 is a block diagram of an example routing protocol 400 used to route requests and responses of Put and Get operations 206, 208 in a replicated distributed cache. As shown in FIG. 4, nodes 104A-104C include respective instances of replicated data partition(s) 402A-402C. Each instance of the replicated data partitions 402A-402C includes key value pairs "K1, V1", "K2, V2", and "K3, V3." Cache client 202A provides a Put request corresponding to Put operation 206 to node 104A. The Put request includes the key "K2" and the value "V2." Node 104A routes the Put request to node 104B via routing layer 204A because node 104B is the primary node for the key "K2" in this example. Node 104B performs a write operation locally in response to receiving the Put request. Node 104B provides a notification to node 104A indicating that node 104B has performed the write operation. Node 104A forwards the notification to cache client 202A. Node 104B meanwhile asynchronously propagates the change to all other nodes of the distributed cache (e.g., node 104C in this example). Get operation 208 is performed locally in the replicated distributed cache.

Figure 5:
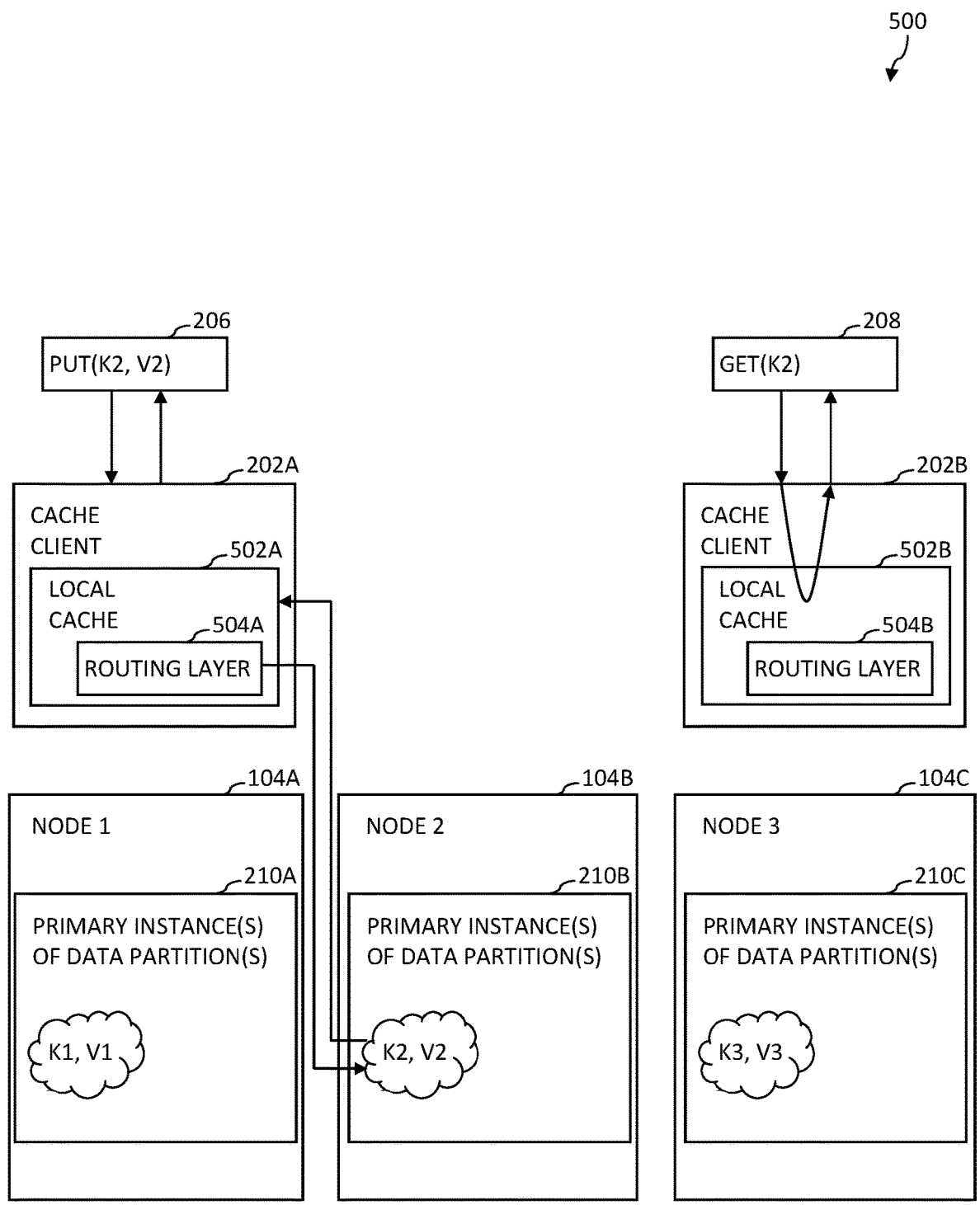
FIG. 5 is a block diagram of an example routing protocol used to route requests and responses of Put and Get operations using local caches.

FIG. 5 is a block diagram of an example routing protocol 500 used to route requests and responses of Put and Get operations 206, 208 using local caches 502A, 502B. As shown in FIG. 5, cache clients 202A, 202B include respective local caches 502A, 502B. For instance, applications may maintain a local cache in the application process space for frequently accessed items. Each local cache 502A, 502B is shown to include a respective routing layer 504A, 504B. In local caches 502A, 502B, payload may be kept in the object form to save the deserialization cost and/or the network hop to the primary node, for example, which may improve performance of the distributed cache.

Figure 6:
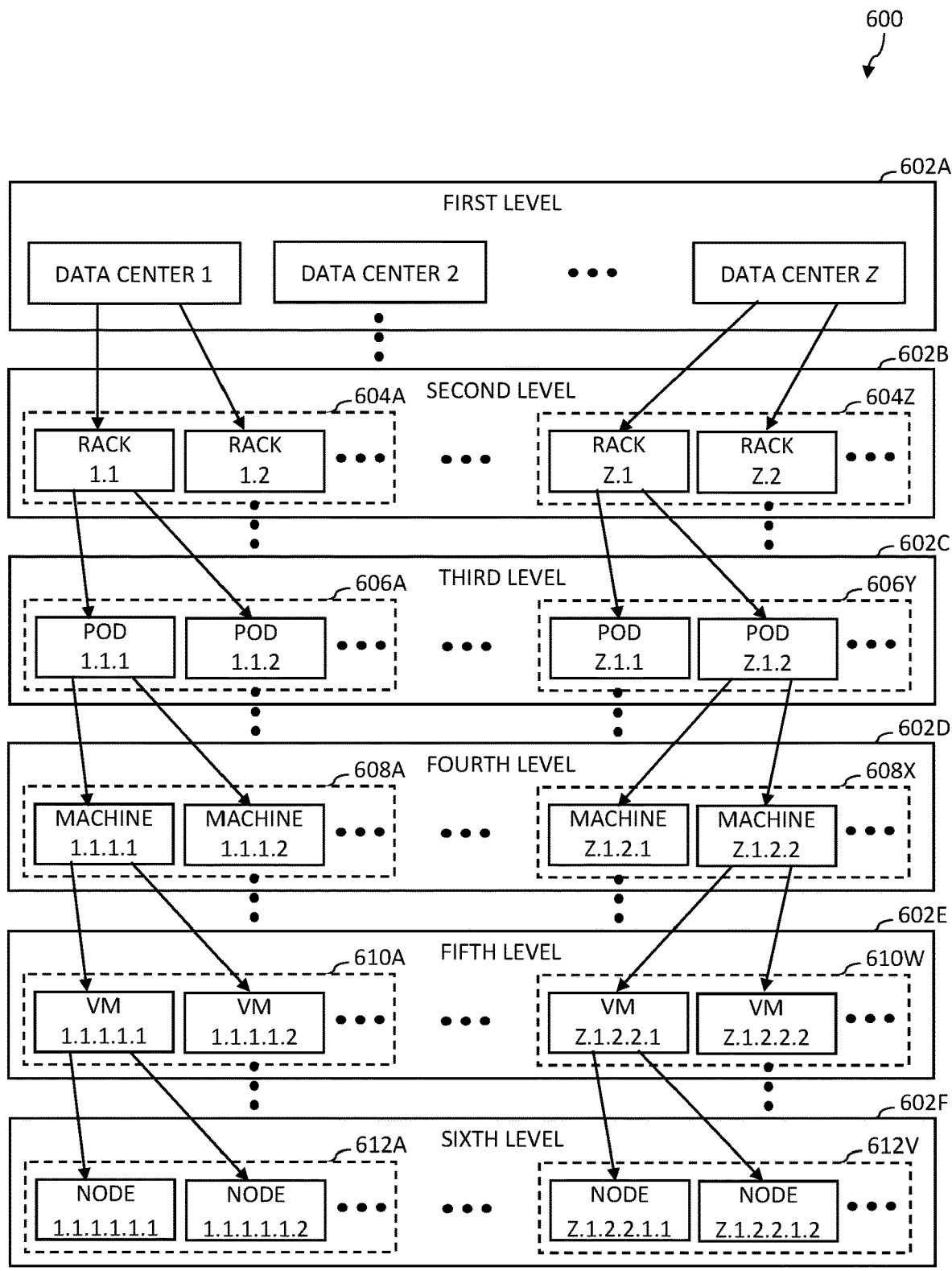
FIG. 6 is a block diagram of an example hierarchical information technology (IT) infrastructure in which a distributed store may be stored in accordance with an embodiment.

III. Example Embodiments for Storing Instances of Data Among Nodes of a Distributed Store Based on Hierarchical Scale Unit Values FIG. 6 is a block diagram of an example hierarchical information technology (IT) infrastructure 600 in which a distributed store (e.g., distributed cache 100 shown in FIG. 1) may be stored in accordance with an embodiment. As shown in FIG. 6, hierarchical IT infrastructure 600 includes levels 602A-602F. For the sake of explanation only, first level 602A will be referred to as being at the top of hierarchical IT infrastructure 600, and sixth level 602F will be referred to as being at the bottom of hierarchical IT infrastructure 600.

First level 602A includes a plurality of data centers, labeled as Data Center 1 through Data Center Z. Second layer 602B includes Z sets of racks, each of which is included in a respective data center of first level 602A. For instance, Data Center 1 in first level 602A includes set 604A of the racks in second level 602B. Data Center Z includes set 604Z of the racks in second level 602B. Each rack in second level 602B is assigned a hierarchical scale unit value that corresponds to that rack and to the data center in which the rack is included. For example, the racks in set 604A, which are included in Data Center 1, are assigned the hierarchical scale unit values 1.1, 1.2, and so on. The racks in set 604Z, which are included in Data Center Z, are assigned the hierarchical scale unit values Z.1, Z.2, and so on.

Third level 602C includes a plurality of sets of pods. Each rack in second level 602B includes a respective set of the pods in third level 602C. For example, Rack 1.1 in second level 602B includes set 606A of the pods in third level 602C. The pods in set 606A are assigned the hierarchical scale unit values 1.1.1, 1.1.2, and so on. Rack Z.1 includes set 606Y of the pods in third level 602C. The pods in set 606Y are assigned the hierarchical scale unit values Z.1.1, Z.1.2, and so on.

Fourth level 602D includes a plurality of sets of machines. Each pod in third level 602C includes a respective set of the machines in fourth level 602D. For example, Pod 1.1.1 in third level 602C includes set 608A of the machines in fourth level 602D. The machines in set 608A are assigned the hierarchical scale unit values 1.1.1.1, 1.1.1.2, and so on. Pod Z.1.2 includes set 608X of the machines in fourth level 602D. The machines in set 608X are assigned the hierarchical scale unit values Z.1.2.1, Z.1.2.2, and so on.

Fifth level 602E includes a plurality of sets of virtual machines. Each machine in fourth level 602D includes a respective set of the virtual machines in fifth level 602E. For example, Machine 1.1.1.1 in fourth level 602D includes set 610A of the virtual machines in fifth level 602E. The virtual machines in set 610A are assigned the hierarchical scale unit values 1.1.1.1.1, 1.1.1.1.2, and so on. Machine Z.1.2.2 includes set 610W of the virtual machines in fifth level 602E. The virtual machines in set 610W are assigned the hierarchical scale unit values Z.1.2.2.1, Z.1.2.2.2, and so on.

Sixth level 602F includes a plurality of sets of nodes. Each virtual machine in fifth level 602E includes a respective set of the nodes in sixth level 602F. For example, Virtual Machine 1.1.1.1.1 in fifth level 602E includes set 612A of the nodes in sixth level 602F. The nodes in set 612A are assigned the hierarchical scale unit values 1.1.1.1.1.1, 1.1.1.1.1.2, and so on. Virtual Machine Z.1.2.2.1 includes set 612V of the nodes in sixth level 602F. The nodes in set 612V are assigned the hierarchical scale unit values Z.1.2.2.1.1, Z.1.2.2.1.2, and so on.

In accordance with some example embodiments, the hierarchical scale unit values are weighted based on at least one factor for the purpose of determining magnitudes of difference between the respective hierarchical scale unit values. Example factors include but are not limited to loads of respective hierarchical scale units of hierarchical IT infrastructure 600, load latencies associated with respective hierarchical scale units of hierarchical IT infrastructure 600, failure probabilities associated with respective hierarchical scale units of hierarchical IT infrastructure 600, etc. A failure probability is a likelihood of encountering a data failure.

A load of a hierarchical scale unit may be based on any of a variety of factors, including but not limited to a proportion of the hierarchical scale unit's processing capabilities that is being consumed, a proportion of the hierarchical scale unit's bandwidth that is being consumed, a number of requests that are processed by the hierarchical scale unit in a designated period of time, and/or other suitable factors. A load latency associated with a hierarchical scale unit may be based on a number of switches that are accessed in order to read and/or write data at the hierarchical scale unit, and/or other suitable factors. For example, storing an instance of a data module at a particular rack may result in a 10% increase in latency as compared to storing the instance at another rack. In another example, storing the instance of the data module at a particular data center may result in a 100% increase in latency as compared to storing the instance at another data center. A failure probability associated with a hierarchical scale unit indicates the likelihood that a data failure is to occur with respect to the hierarchical scale unit. Further discussion of weighted hierarchical scale unit values is provided below with reference to FIGS. 8 and 9.

As shown in FIG. 6, hierarchical IT infrastructure 600 includes six levels 602A-602F for illustrative purposes and is not intended to be limiting. Persons skilled in the relevant art(s) will recognize that hierarchical IT infrastructure 600 may include any number of levels. For instance, hierarchical IT infrastructure 600 may not include one or more of the levels 602A-602F. Moreover, hierarchical IT infrastructure 600 may include level(s) in addition to or in lieu of one or more of the levels 602A-602F.

Hierarchical scale unit values, such as the example hierarchical scale unit values described with respect to FIG. 6, may be used to store instances of a data module among the hierarchical scale units (e.g., nodes, virtual machines, machines, etc.) of the distributed store based on a magnitude of a difference between respective hierarchical scale unit values. Techniques for storing instances of a data module among nodes of a distributed store are discussed in greater detail below with reference to FIGS. 7-11.

Figure 7:
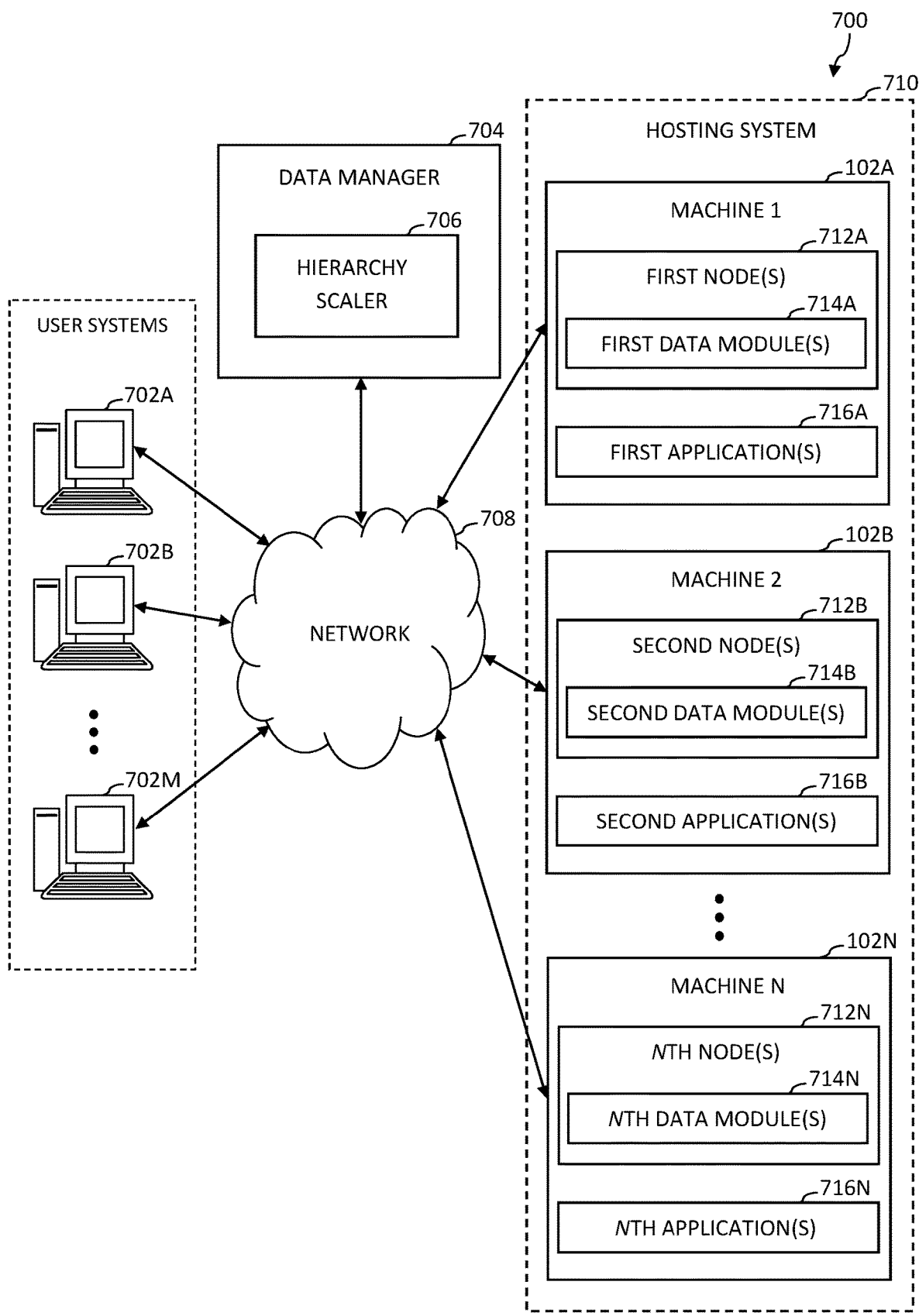
FIG. 7 is a block diagram of an example computer system that utilizes a distributed store in accordance with an embodiment.

FIG. 7 is a block diagram of an example computer system 700 that utilizes a distributed store (e.g., distributed cache 100 shown in FIG. 1) in accordance with an embodiment. Generally speaking, computer system 700 operates to store instances of data (e.g., objects) among nodes of the distributed store. As shown in FIG. 7, computer system 700 includes a plurality of user systems 702A-702M, a data manager 704, a network 708, and a hosting system 710. Hosting system 710 includes a plurality of machines 102A-102N, which are discussed in greater detail below. Communication among user systems 702A-702M, data manager 704, and machines 102A-102N is carried out over network 708 using well-known network communication protocols. Network 708 may be a wide-area network (e.g., the Internet), a local area network (LAN), another type of network, or a combination thereof.

User systems 702A-702M are computers or other processing systems, each including one or more processors, that are capable of communicating with machines 102A-102N. User systems 702A-702M are capable of accessing data that is stored in the distributed store, which is hosted by hosting system 710. The distributed store includes nodes 712A-712N, which are hosted by respective machines 102A-102N. For example, user systems 702A-702M may be configured to provide write requests (e.g., Put requests) to machines 102A-102N for requesting to write data thereto. In another example, user systems 702A-702M may be configured to provide read requests (e.g., Get requests) to machines 102A-102M for requesting to read data that is stored thereon. For instance, a user may initiate a write request or a read request using a client deployed on a user system 702 that is owned by or otherwise accessible to the user.

Hosting system 710 hosts the distributed store. Hosting system 710 includes a plurality of machines 102A-102N. Machines 102A-102N are computers or other processing systems, each including one or more processors, that are capable of communicating with user systems 702A-702M. Machines 102A-102N are configured to host respective node(s) 712A-712N. Each node includes respective data module(s) of the distributed store. As shown in FIG. 1, first node(s) 712A include first data module(s) 714A, second node(s) 712B include second module(s) 714B, and so on.

A data module is a respective portion (e.g., item(s), region(s), partition(s), etc.) of the distributed store or a replica of the distributed store. It should be noted that any portion of the distributed store may be replicated across nodes 712A-712N. For instance, a first instance of a portion may be included in a node of the first node(s) 712A, a second instance of the portion may be included in a node of the second node(s) 712B, and so on. Moreover, a node may include multiple instances of the same portion of the distributed store. For example, a node of the first node(s) 712A may include two or more instances of item(s), region(s), data partition(s), or other suitable portion of the distributed store. A "replica of the distributed store", however, refers to an instance of all data stored in the distributed store.

Any number of instances of a data module may be stored among nodes 712A-712N. One instance of the data module is often specified as the primary instance of that data module with respect to a data operation at a given time, though it will be recognized that multiple primary instances of the data module may be stored among nodes 712A-712N for purposes such as enabling or facilitating scalability of data operations with respect to the data module. Some example embodiments are described with reference to storage of a single primary instance of a data module for illustrative purposes and are not intended to be limiting. Persons skilled in the relevant art(s) will recognize that such example embodiments are applicable to storage of multiple primary instances of the data module.

Primary instance(s) of the data module with respect to a data operation are said to be in a primary state with respect to the data operation, and any other instances are said to be in a secondary state with respect to the data operation. It should be noted that a node that includes a primary instance of a data module is referred to as the primary node for that data module. Nodes that include secondary instances of a data module are referred to as secondary nodes for that data module. It will be recognized that a node may be the primary node for some data modules and a secondary node for other data modules.

Any of a variety of applications may be deployed on machines 102A-102N. As shown in FIG. 7, first application(s) 716A are deployed on machine 102A, second application(s) 716B are deployed on machine 102B, and so on. Application(s) 716A-716N may perform operations that create new data to be written to the distributed store or that read or modify existing data that is stored in the distributed store. For instance, applications 716A-716N may use Put requests and Get requests to respectively write and read data across machines 102A-102N. In some example embodiments, user systems 702A-702M are capable of accessing one or more of the applications 716A-716N without having to go through network 708. Any one or more of the application(s) 716A-716N may be deployed on a respective user system 702A-702M, in addition to or in lieu of being deployed on a respective machine 102A-102N.

Data manager 704 is at least one computer or other processing system(s), including one or more processors, which distributes instances of data modules of the distributed store among machines 102A-102N. Data manager 704 also determines which instances of respective data modules are to be primary data modules and which are to be secondary data modules.

Data manager 704 includes a hierarchy scaler 706. Hierarchy scaler 706 is configured to assign hierarchical scale unit values to respective hierarchical scale units of a hierarchical IT infrastructure (e.g., hierarchical IT infrastructure 600) that stores the distributed store. The hierarchical scale unit value that is assigned to a hierarchical scale unit corresponds to that hierarchical scale unit and each of the hierarchical scale units in other respective levels of the hierarchical IT infrastructure that include that hierarchical scale unit. For instance, hierarchical scaler 706 may assign a hierarchical scale unit value to each of the nodes 712A-712N. For example, the hierarchical scale unit value(s) assigned to respective first node(s) 712A may indicate that first node(s) 712A are included in machine 102A and/or perhaps hierarchical scale unit(s) in other respective level(s) of the hierarchical IT infrastructure. The hierarchical scale unit value(s) assigned to respective second node(s) 712B may indicate that second node(s) 712B are included in machine 102B and/or perhaps hierarchical scale unit(s) in other respective level(s) of the hierarchical IT infrastructure, and so on.

Hierarchy scaler 706 is further configured to store instances of a data module among nodes 712A-712N based on the hierarchical scale unit values that are assigned to nodes 712A-712N. For example, hierarchical scaler 706 may store first and second instances of the data module in respective first and second nodes 712A, 712B having respective first and second hierarchical scale unit values based on a magnitude of a difference between the first and second hierarchical scale unit values. In an example embodiment, the first instance of the data module is a primary instance, and the second instance of the data module is a secondary instance. In another example embodiment, the first and second instances of the data module are respective primary instances. In yet another example embodiment, the first and second instances of the data module are respective secondary instances. Further discussion of techniques for storing instances of a data module among nodes of a distributed store is provided below with reference to FIGS. 8-11.

Data manager 704 is shown in FIG. 7 to be a standalone computer(s) or processing system(s) for illustrative purposes and is not intended to be limiting. It will be recognized that data manager 704 may be partially or entirely incorporated into hosting system 710. For instance, a portion or all of data manager 704 may be stored on one of the machines 102A-102N or distributed among any two or more of the machines 102A-102N.

In an example embodiment, hosting system 710 is configured in a cloud of a cloud computing environment. For instance, machines 102A-102N may be servers that are accessible over the Internet via a client (e.g., Web crawler, Web browser, etc.) deployed on a user system 702 that is owned by or otherwise accessible to a user.

In another example embodiment, the distributed store is a distributed cache. In accordance with this example embodiment, computer system 700 may further include a database (not shown in FIG. 7). The database may be configured to store original data in a structured manner in accordance with a database model (e.g., a relational model, a hierarchical model, a network model, etc.). User systems 702A-702M and/or machines 102A-102N may access the original data in accordance with query language(s), including but not limited to structured query language (SQL), SPARQL, extensible markup language path language (XPath), etc. Any one or more data modules 714A-714C of the distributed store may store a frequently used subset of the original data that is stored in the database, for example. The original data may be expensive to access due to a relatively longer access time associated with the database, as compared to an access time associated with the distributed store. Accordingly, it may be desirable to access the data at the nodes 712A-712N, rather than at the database.

Figure 8A:
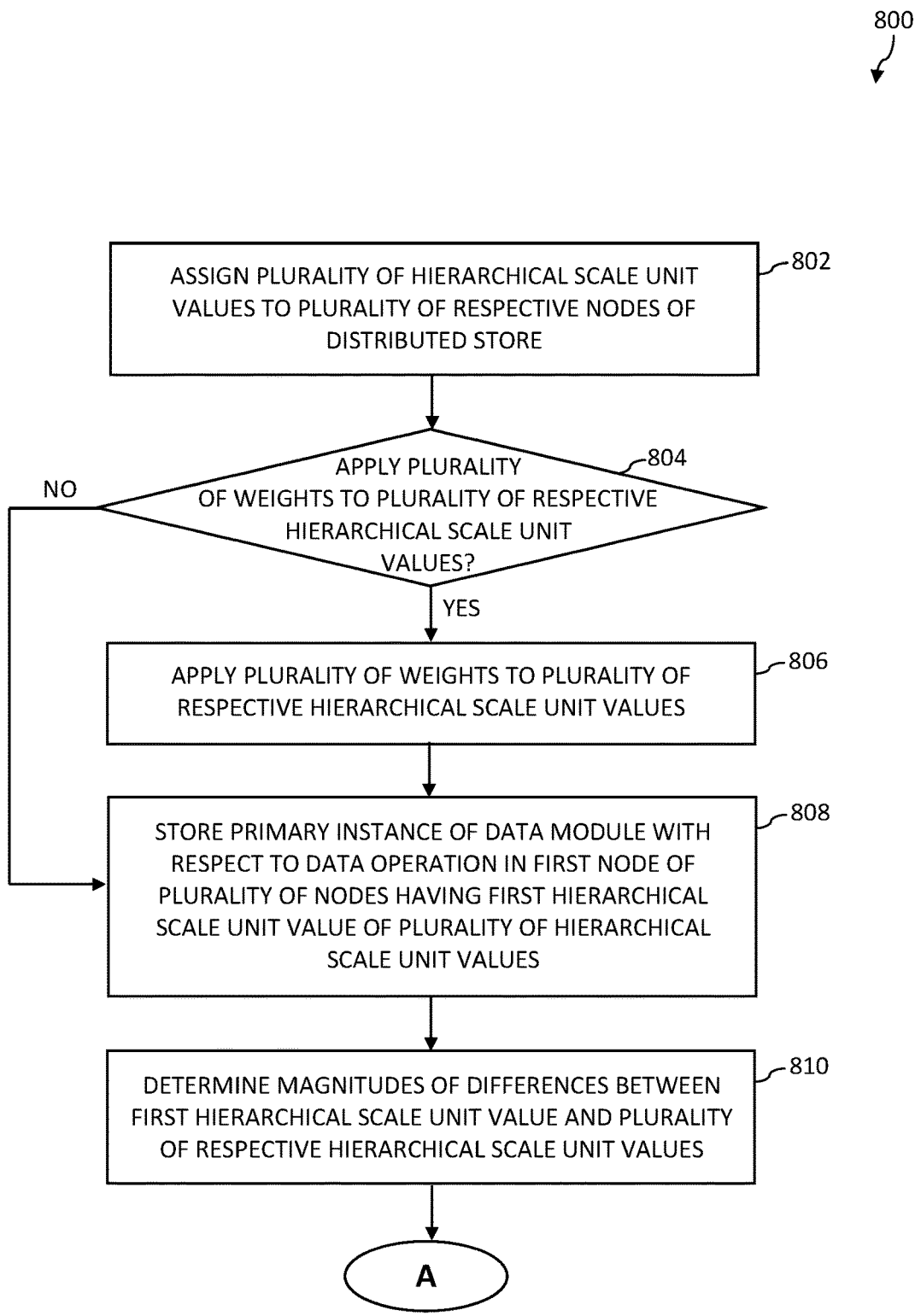
FIGS. 8A-8C depict respective portions of a flowchart of a method for storing instances of a data module among nodes of a distributed store based on hierarchical scale unit values in accordance with an embodiment.
Figure 8B:
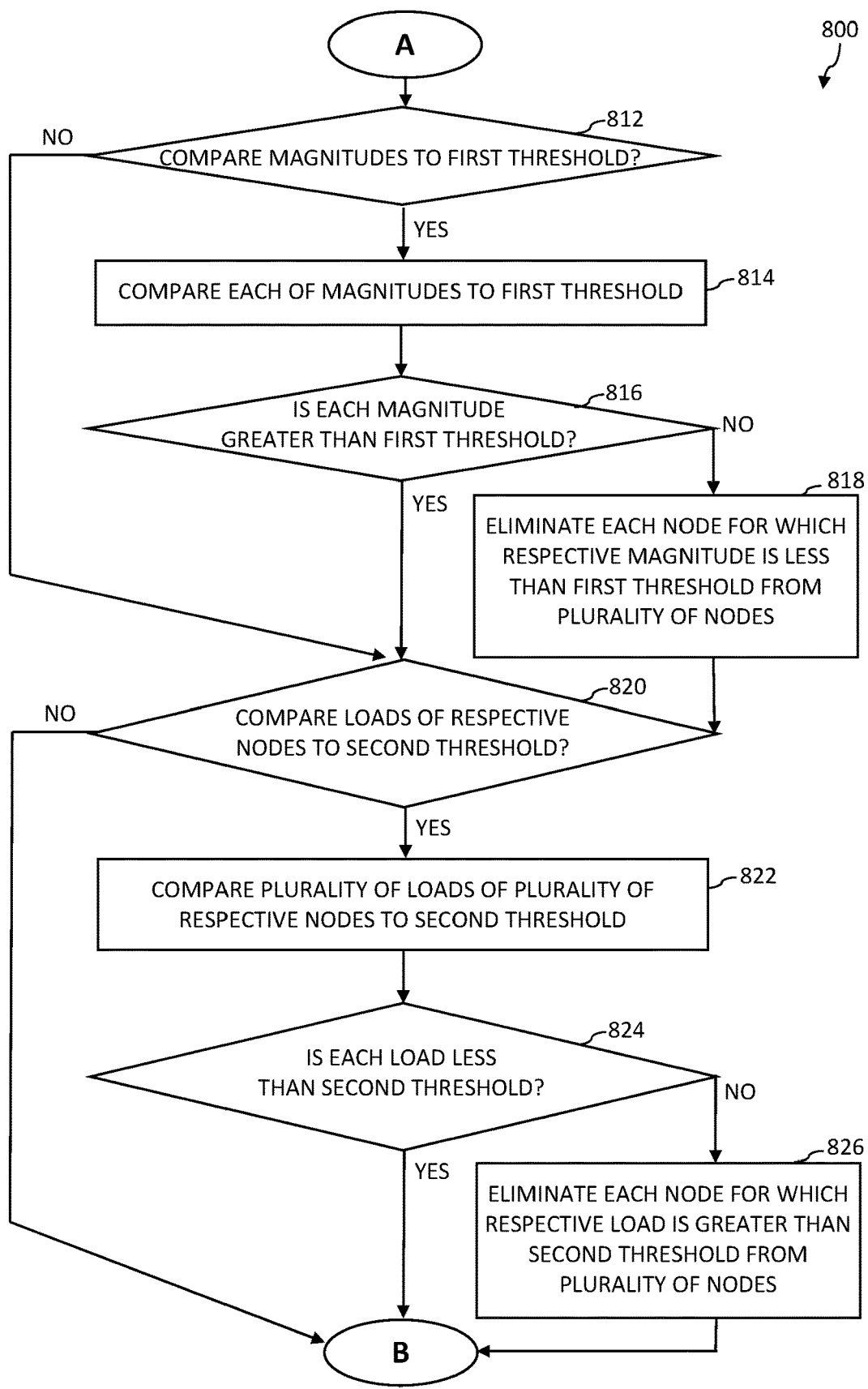
Figure 8C:
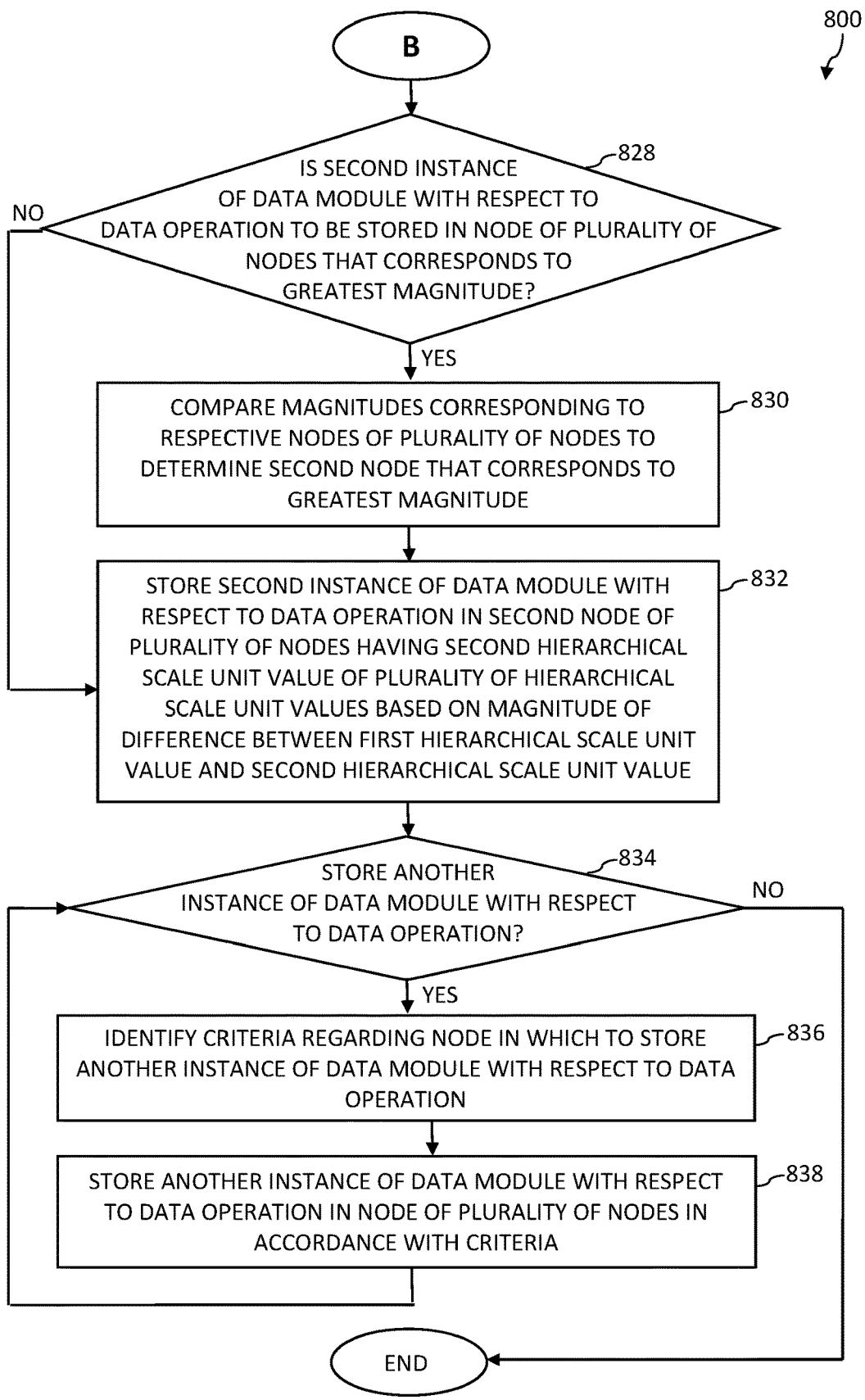

FIGS. 8A-8C depict respective portions of a flowchart 800 of a method for storing instances of a data module among nodes of a distributed store based on hierarchical scale unit values in accordance with an embodiment. Flowchart 800 is described from the perspective of a data manager. Flowchart 800 may be performed by data manager 704 of computer system 700 shown in FIG. 7, for example. For illustrative purposes, flowchart 800 is described with respect to a data manager 704' shown in FIG. 9, which is an example of a data manager 704, according to an embodiment. In this document, whenever a prime is used to modify a reference number, the modified reference number indicates an example (or alternate) implementation of the element that corresponds to the reference number.

Figure 9:
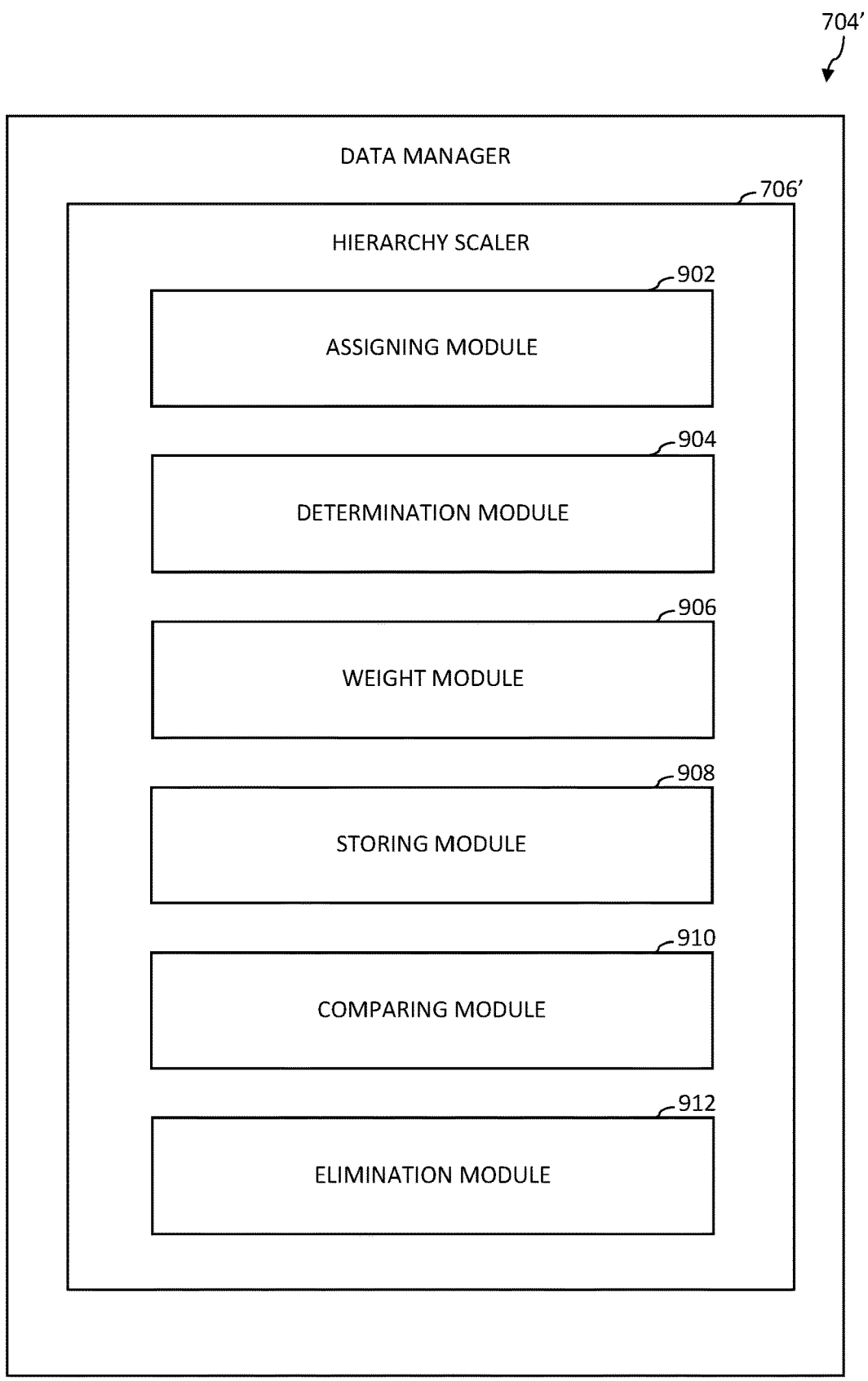
FIG. 9 is a block diagram of an example implementation of a data manager shown in FIG. 7 in accordance with an embodiment.

As shown in FIG. 9, data manager 704' includes a hierarchy scaler 706'. Hierarchy scaler 706' includes an assigning module 902, a determination module 904, a weight module 906, a storing module 908, a comparing module 910, and an elimination module 912. Further structural and operational embodiments will be apparent to persons skilled in the relevant art(s) based on the discussion regarding flowchart 800. Flowchart 800 is described as follows.

As shown in FIG. 8A, the method of flowchart 800 begins at step 802. In step 802, a plurality of hierarchical scale unit values is assigned to a plurality of respective nodes of a distributed store. In an example implementation, assigning module 902 assigns the plurality of hierarchical scale unit values to the plurality of respective nodes.

At step 804, a determination is made whether a plurality of weights is to be applied to the plurality of respective hierarchical scale unit values. The plurality of weights may be based on any suitable one or more factors, including but not limited to loads of respective nodes to which the respective hierarchical scale unit values are assigned, load latencies of the respective nodes to which the respective hierarchical scale unit values are assigned, failure probabilities of the respective nodes to which the respective hierarchical scale unit values are assigned, etc. The determination whether the plurality of weights is to be applied to the plurality of respective hierarchical scale unit values may be based on a value of a weight indicator. For instance, the weight indicator having a first value may indicate that the weights are to be applied. The weight indicator having a second value may indicate that the weights are not to be applied. In an example implementation, determination module 904 determines whether the plurality of weights is to be applied to the plurality of respective hierarchical scale unit values. If the plurality of weights is to be applied to the plurality of respective hierarchical scale unit values, flow continues to step 806. Otherwise, flow continues to step 808.

At step 806, the plurality of weights is applied to the plurality of respective hierarchical scale unit values. For instance, the plurality of hierarchical values may be multiplied by the plurality of respective weights to provide weighted hierarchical weighted scale unit values. In an example implementation, weight module 906 applies the plurality of weights to the plurality of respective hierarchical scale unit values.

At step 808, a primary instance of a data module with respect to a data operation is stored in a first node of the plurality of nodes. A primary instance of a data module with respect to a data operation is an instance of the data module at which the data operation with respect to the data module is initially directed or at which the data operation with respect to the data module is initiated. The first node has a first hierarchical scale unit value of the plurality of hierarchical scale unit values. In an example implementation, storing module 908 stores the primary instance of the data module with respect to the data operation in the first node.

At step 810, magnitudes of differences between the first hierarchical scale unit value and the plurality of respective hierarchical scale unit values are determined. For instance, each hierarchical scale unit value of the plurality of hierarchical scale unit values may be compared to the first hierarchical scale unit value to provide a respective difference therebetween, the difference having a respective magnitude. In an example implementation, determination module 904 determines the magnitudes of the differences. Upon performance of step 810, flow continues to step 812, which is shown in FIG. 8B.

At step 812, a determination is made whether the magnitudes are to be compared to a first threshold. The determination whether the magnitudes are to be compared to the first threshold may be based on a value of a threshold indicator. For instance, the threshold indicator having a first value may indicate that the magnitudes are to be compared to the first threshold. The threshold indicator having a second value may indicate that the magnitudes are not to be compared to the first threshold. In an example implementation, determination module 904 determines whether the magnitudes are to be compared to the first threshold. If the magnitudes are not to be compared to the first threshold, flow continues to step 820. If the magnitudes are to be compared to the first threshold, however, flow continues to step 814.

At step 814, each of the magnitudes is compared to the first threshold. In an example implementation, comparing module 910 compares each of the magnitudes to the first threshold.

At step 816, a determination is made whether each magnitude is greater than the first threshold. In an example implementation, determination module 904 determines whether each magnitude is greater than the first threshold. If each magnitude is greater than the first threshold, flow continues to step 820. Otherwise, flow continues to step 818.

At step 818, each node for which the respective magnitude is less than the first threshold is eliminated from the plurality of nodes. It should be noted that eliminating such nodes from the plurality of nodes does not affect the operability of those nodes. Rather, such nodes are merely eliminated from consideration for storing a second instance of the data module with respect to flowchart 800. In an example implementation, elimination module 912 eliminates each node for which the respective magnitude is less than the first threshold from the plurality of nodes.

At step 820, a determination is made whether loads of respective nodes are to be compared to a second threshold. The determination whether the loads of the respective nodes are to be compared to the second threshold may be based on a value of a load indicator. For example, the load indicator having a first value may indicate that the loads of the respective nodes are to be compared to the second threshold. The threshold indicator having a second value may indicate that the loads of the respective nodes are not to be compared to the second threshold. In an example implementation, determination module 904 determines whether the loads of the respective nodes are to be compared to the second threshold. If the loads of the respective nodes are to be compared to the second threshold, flow continues to step 822. Otherwise, flow continues to step 828, which is shown in FIG. 8C.

At step 822, a plurality of loads of the plurality of respective nodes is compared to the second threshold. The load of a node may be based on any of a variety of factors, including but not limited to a proportion of the node's processing capabilities that is being consumed, a proportion of the node's bandwidth that is being consumed, a number of requests that are processed by the node in a designated period of time, and/or other suitable factors. In an example implementation, comparing module 910 compares the plurality of loads of the plurality of respective nodes to the second threshold.

At step 824, a determination is made whether each load is less than the second threshold. In an example implementation, determination module 904 determines whether each load is less than the second threshold. If each load is less than the second threshold, flow continues to step 828, which is shown in FIG. 8C. Otherwise, flow continues to step 826.

At step 826, each node for which the respective load is greater than the second threshold is eliminated from the plurality of nodes. It should be noted that eliminating such nodes from the plurality of nodes does not affect the operability of those nodes. Rather, such nodes are merely eliminated from consideration for storing a second instance of the data module with respect to flowchart 800. In an example implementation, elimination module 912 eliminates each node for which the respective load is greater than the second threshold from the plurality of nodes.

At step 828, a determination is made whether a second instance of the data module with respect to the data operation is to be stored in a node of the plurality of nodes that corresponds to the greatest magnitude. The second instance may be another primary instance or a secondary instance of the data module. A secondary instance of a data module with respect to a data operation is an instance of the data module at which the data operation with respect to the data module is not initially directed and at which the data operation with respect to the data module is not initiated. For instance, it may be desirable for the primary instance and the secondary instance of the data module with respect to the data operation to be stored as far from each other as possible within the hierarchical IT infrastructure.

The determination whether the second instance of the data module with respect to the data operation is to be stored in a node of the plurality of nodes that corresponds to the greatest magnitude may be based on a value of a magnitude indicator. For instance, the magnitude indicator having a first value may indicate that the second instance of the data module with respect to the data operation is to be stored in a node of the plurality of nodes that corresponds to the greatest magnitude. The magnitude indicator having a second value may indicate that no requirement exists for the second instance of the data module with respect to the data operation to be stored in a node of the plurality of nodes that corresponds to the greatest magnitude.

In an example implementation, determination module 904 determines whether the second instance of the data module with respect to the data operation is to be stored in the node of the plurality of nodes that corresponds to the greatest magnitude. If the second instance of the data module with respect to the data operation is to be stored in the node of the plurality of nodes that corresponds to the greatest magnitude, flow continues to step 830. Otherwise, flow continues to step 832.

At step 830, the magnitudes corresponding to the respective nodes of the plurality of nodes are compared to determine a second node that corresponds to the greatest magnitude. For instance, the node that corresponds to the greatest magnitude may be designated as the second node. In an example implementation, comparing module 910 compares the magnitudes corresponding to the respective nodes of the plurality of nodes to determine the second node that corresponds to the greatest magnitude.

At step 832, a second instance of the data module with respect to the data operation is stored in a second node of the plurality of nodes having a second hierarchical scale unit value of the plurality of hierarchical scale unit values based on a magnitude of a difference between the first hierarchical scale unit value and the second hierarchical scale unit value. For example, if step 812 was performed, the second instance with respect to the data operation is stored based on the magnitude of the difference between the first and second hierarchical scale unit values exceeding the first threshold. If step 828 was performed, the second instance with respect to the data operation is stored in the second node based on the magnitude of the difference between the first and second hierarchical scale unit values being the greatest magnitude generally or being the greatest magnitude with respect to nodes having respective loads that are less than the second threshold. In an example implementation, storing module 908 stores the second instance of the data module with respect to the data operation in the second node.

At step 834, a determination is made whether another instance of the data module with respect to the data operation is to be stored. The determination whether another instance of the data module with respect to the data operation is to be stored may be based on a value of an instance indicator. For example, the instance indicator having a first value may indicate that another instance of the data module with respect to the data operation is to be stored. The instance indicator having a second value may indicate that no other instance of the data module with respect to the data operation is to be stored. In an example implementation, determination module 904 determines whether another instance of the data module with respect to the data operation is to be stored. If another instance of the data module with respect to the data operation is to be stored, flow continues to step 836. Otherwise, flowchart 800 ends.

At step 836, criteria regarding a node in which another instance of the data module with respect to the data operation is to be stored are identified. For example, the criteria may specify that the node is to have a hierarchical scale unit value that is less than a hierarchical scale unit value of any other node of the plurality of nodes other than the first and second nodes. In another example, the criteria may specify that the node is to have a hierarchical scale unit value that is greater than a hierarchical scale unit value of any other node of the plurality of nodes other than the first and second nodes. In yet another example, the criteria may specify that the node is to have a hierarchical scale unit value that is approximately half of the sum of the first and second hierarchical scale unit values. In still another example, the criteria may specify that another instance of the data module is to be stored in a node based on a load of the node. For instance, the criteria may specify that the load of the node is not to exceed a threshold in order for another instance of the data module with respect to the data operation to be stored in the node.

In an example implementation, determination module 904 identifies the criteria of the node in which another instance of the data module with respect to the data operation is to be stored. The example criteria discussed herein are provided for illustrative purposes and are not intended to be limiting. Any suitable criteria regarding a node may be specified for storing another instance of the data module with respect to the data operation in the node.

At step 838, another instance of the data module with respect to the data operation is stored in a node of the plurality of nodes in accordance with the criteria. In an example implementation, storing module 908 stores another instance of the data module with respect to the data operation in the node of the plurality of nodes in accordance with the criteria.

In some example embodiments, one or more steps 802, 804, 806, 808, 810, 812, 814, 816, 818, 820, 822, 824, 826, 828, 830, 832, 834, 836, and/or 838 of flowchart 800 may not be performed. Moreover, steps in addition to or in lieu of steps 802, 804, 806, 808, 810, 812, 814, 816, 818, 820, 822, 824, 826, 828, 830, 832, 834, 836, and/or 838 may be performed. It will be recognized that any one or more factors that are considered for storing a primary instance of a data module with respect to a data operation may be used for storing a secondary instance of the data module with respect to the data operation, and vice versa. Moreover, factor(s) that may be used to apply weights to hierarchical scale unit values may be used for storing instance(s) of a data module among hierarchical scale units (e.g., nodes) having hierarchical scale unit values that are not weighted.

For instance, it may be desirable to store instance(s) of a data module at hierarchical scale units that have relatively low loads, load latencies, and/or failure probabilities. Accordingly, an instance of the data module may be stored at a hierarchical scale unit having a load that is less than a threshold load. In accordance with this example, hierarchical scale units having respective loads that exceed the threshold load may not be considered for storage of the instance of the data module.

In another example, an instance of the data module may be stored at a hierarchical scale unit having a load that is less than a load of other hierarchical scale unit(s) (e.g., any other hierarchical scale unit) in a designated level of the hierarchical IT infrastructure.

In yet another example, an instance of the data module may be stored at a hierarchical scale unit having a load latency that is less than a threshold latency. In accordance with this example, hierarchical scale units having respective load latencies that exceed the threshold latency may not be considered for storage of the instance of the data module.

In still another example, an instance of the data module may be stored at a hierarchical scale unit having a load latency that is less than a load latency of other hierarchical scale unit(s) (e.g., any other hierarchical scale unit) in a designated level of the hierarchical IT infrastructure.

In another example, an instance of a data module may be stored at a hierarchical scale unit having a failure probability that is less than the threshold failure probability. In accordance with this example, hierarchical scale units having respective failure probabilities that exceed the threshold may not be considered for storage of the instance of the data module.

In yet another example, an instance of the data module may be stored at a hierarchical scale unit having a failure probability that is less than a failure probability of other hierarchical scale unit(s) (e.g., any other hierarchical scale unit) in a designated level of the hierarchical IT infrastructure.

It will be recognized that data manager 704' may not include one or more of assigning module 902, determination module 904, weight module 906, storing module 908, comparing module 910, and/or elimination module 912. Furthermore, data manager 704' may include modules in addition to or in lieu of assigning module 902, determination module 904, weight module 906, storing module 908, comparing module 910, and/or elimination module 912.

Figure 10:
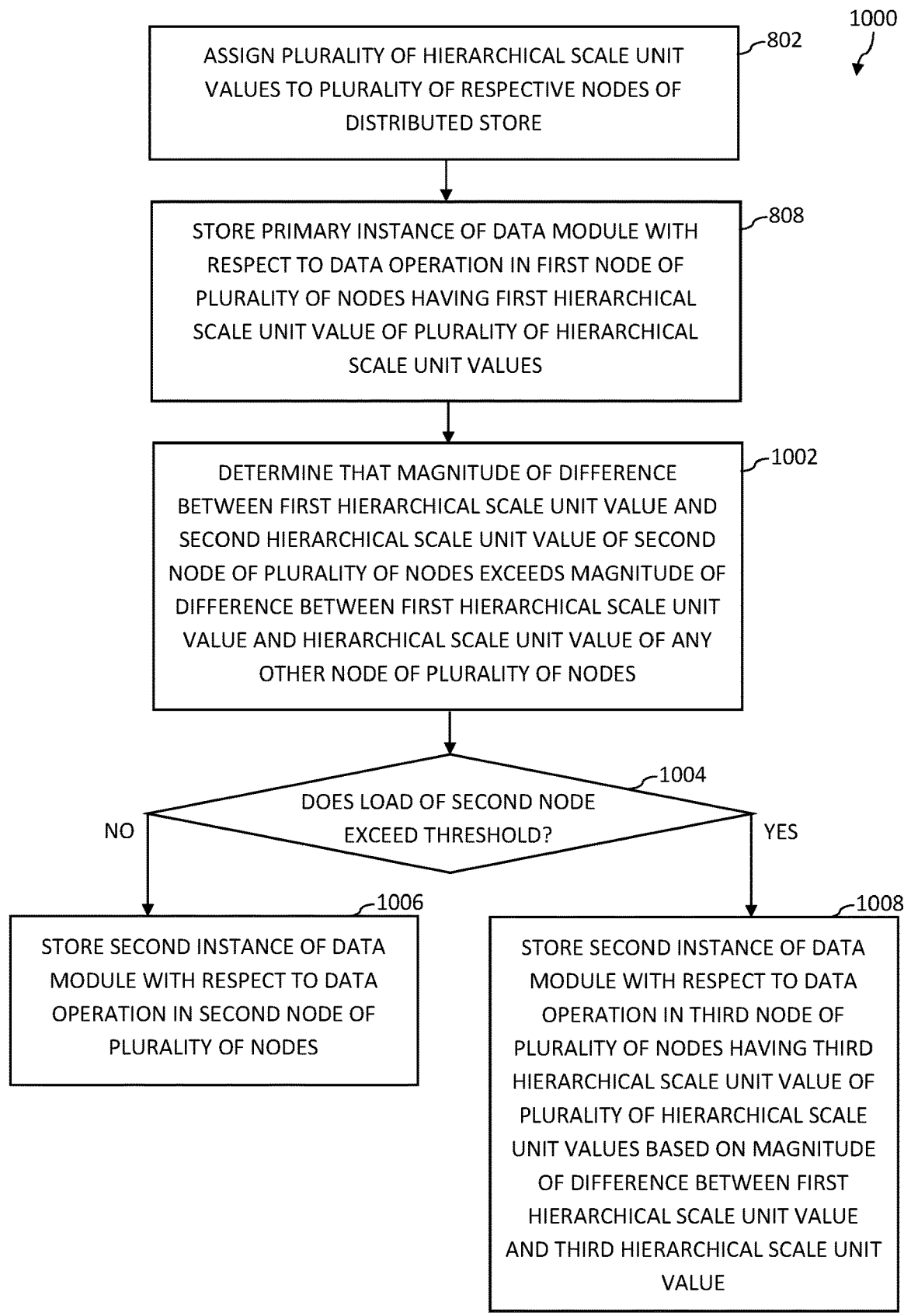
FIG. 10 depicts a flowchart of another method for storing instances of a data module among nodes of a distributed store based on hierarchical scale unit values in accordance with an embodiment.

FIG. 10 depicts a flowchart 1000 of another method for storing instances of a data module among nodes of a distributed store based on hierarchical scale unit values in accordance with an embodiment. Flowchart 1000 is described from the perspective of a data manager. Flowchart 1000 may be performed by data manager 704 of computer system 700 shown in FIG. 7, for example. For illustrative purposes, flowchart 1000 is described with respect to a data manager 704" shown in FIG. 11, which is an example of a data manager 704, according to an embodiment.

Figure 11:
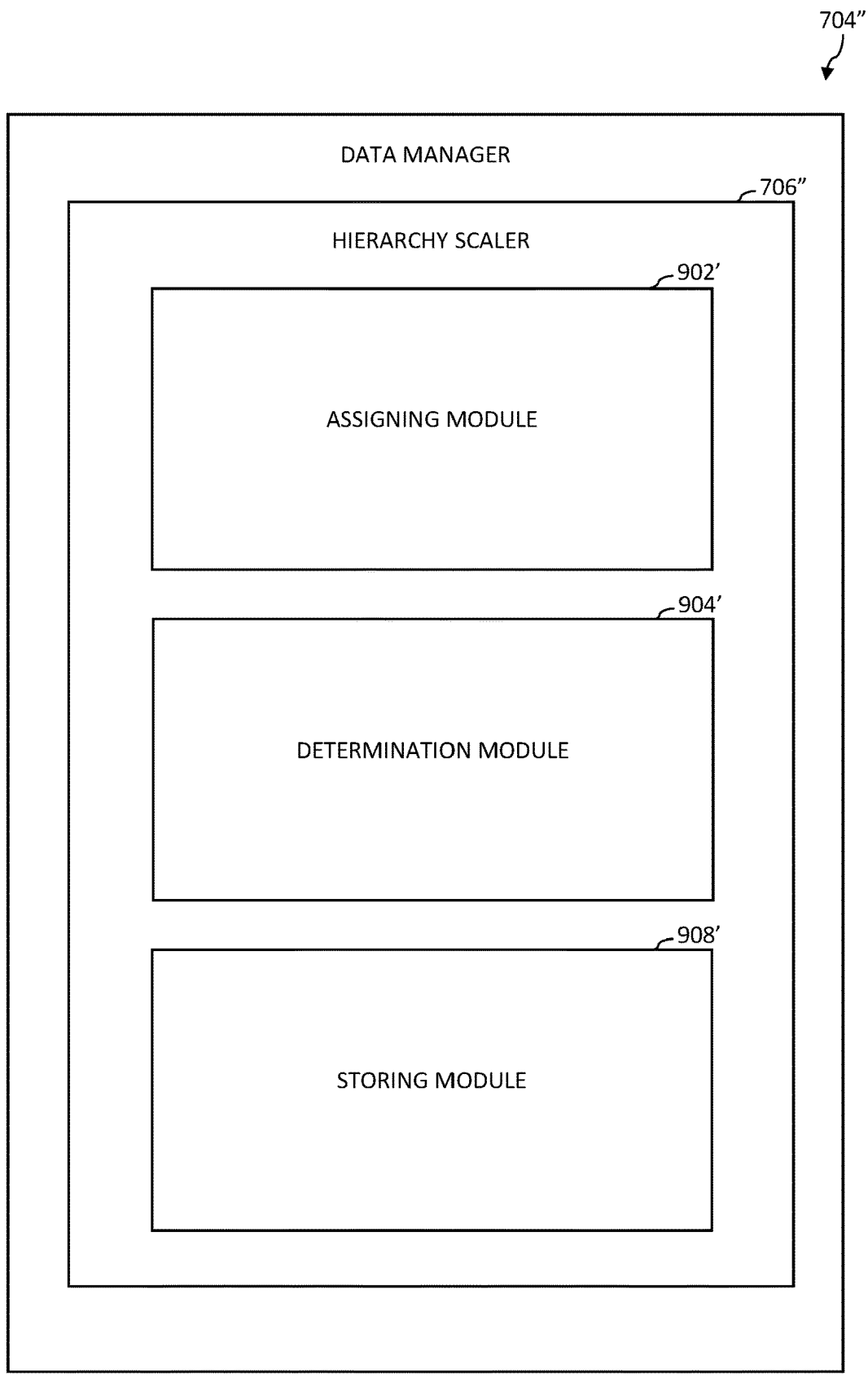
FIG. 11 is a block diagram of another example implementation of a data manager shown in FIG. 7 in accordance with an embodiment.

As shown in FIG. 11, data manager 704" includes a hierarchy scaler 706". Hierarchy scaler 706" includes an assigning module 902', a determination module 904', and a storing module 908'. Further structural and operational embodiments will be apparent to persons skilled in the relevant art(s) based on the discussion regarding flowchart 1000. Flowchart 1000 is described as follows.

As shown in FIG. 10, the method of flowchart 1000 begins at step 802. In step 802, a plurality of hierarchical scale unit values are assigned to a plurality of respective nodes of a distributed store. In an example implementation, assigning module 902' assigns the plurality of hierarchical scale unit values to the plurality of respective nodes.

At step 808, a primary instance of a data module with respect to a data operation is stored in a first node of the plurality of nodes. A primary instance of a data module with respect to a data operation is an instance of the data module at which the data operation with respect to the data module is initially directed or at which the data operation with respect to the data module is initiated. The first node has a first hierarchical scale unit value of the plurality of hierarchical scale unit values. In an example implementation, storing module 908' stores the primary instance of the data module with respect to the data operation in the first node.

At step 1002, a determination is made that a magnitude of a difference between the first hierarchical scale unit value and a second hierarchical scale unit value of a second node of the plurality of nodes exceeds a magnitude of a difference between the first hierarchical scale unit value and a hierarchical scale unit value of any other node of the plurality of nodes. In an example implementation, determination module 904' determines that the magnitude of the difference between the first hierarchical scale unit value and the second hierarchical scale unit value exceeds the magnitude of the difference between the first hierarchical scale unit value and the hierarchical scale unit value of any other node of the plurality of nodes.

At step 1004, a determination is made whether a load of the second node exceeds a threshold. In an example implementation, determination module 904 determines whether the load of the second node exceeds the threshold. If the load of the second node does not exceed the threshold, flow continues to step 1006. If the load of the second node exceeds the threshold, however, flow continues to step 1008.

At step 1006, a second instance of the data module with respect to the data operation is stored in the second node of the plurality of nodes. In an example implementation, storing module 908 stores the second instance of the data module with respect to a data operation in the second node.

At step 1008, a second instance of the data module with respect to the data operation is stored in a third node of the plurality of nodes having a third hierarchical scale unit value of the plurality of hierarchical scale unit values based on a magnitude of a difference between the first hierarchical scale unit value and the third hierarchical scale unit value. In an example implementation, storing module 908 stores the second instance of the data module with respect to the data operation in the third node.

In some example embodiments, one or more steps 802, 808, 1002, 1004, 1006, and/or 1008 of flowchart 1000 may not be performed. Moreover, steps in addition to or in lieu of steps 802, 808, 1002, 1004, 1006, and/or 1008 may be performed.

Figure 12:
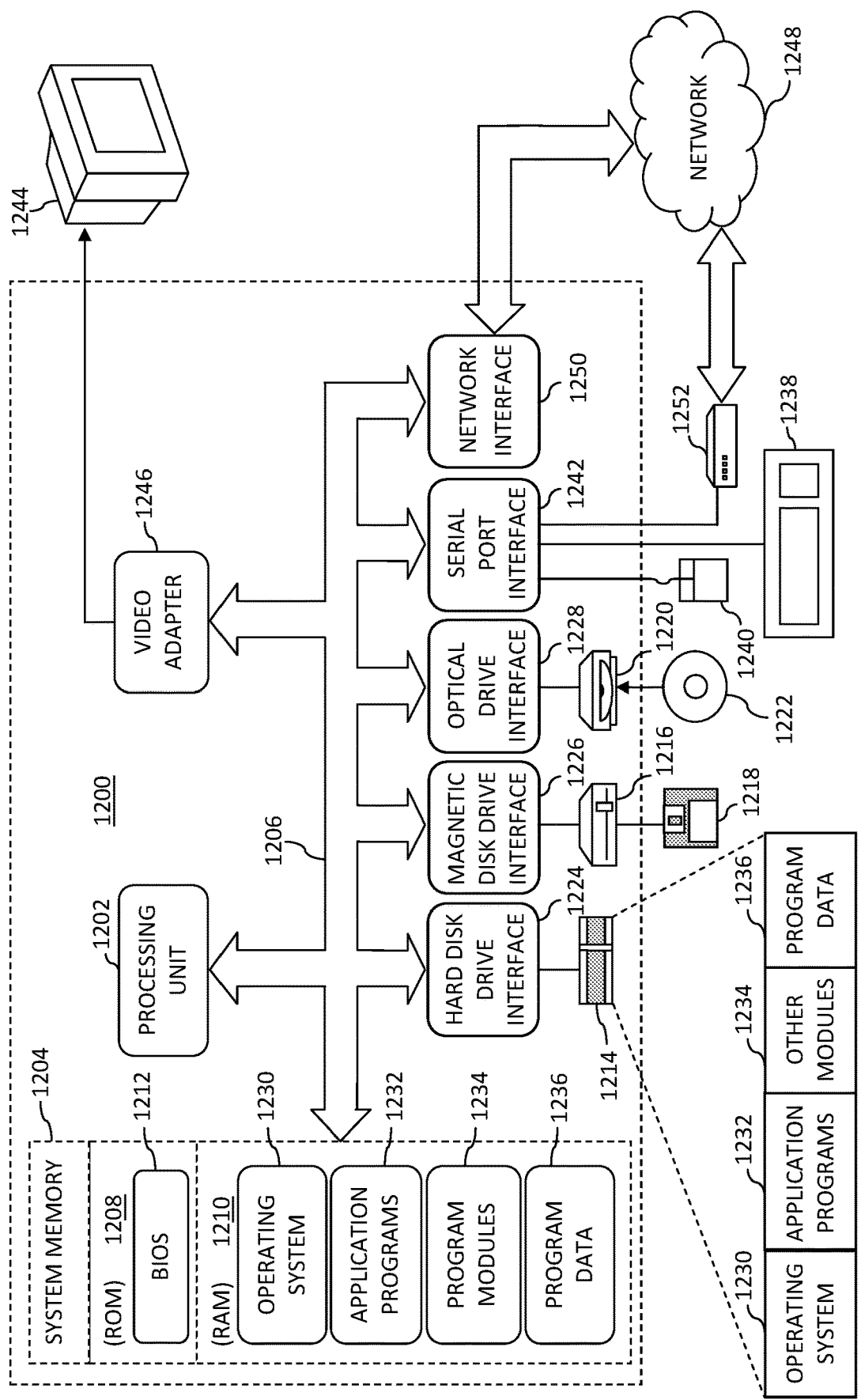
FIG. 12 depicts an example computer in which embodiments may be implemented.

FIG. 12 depicts an example computer 1200 in which embodiments may be implemented. Any one or more of the machines 102A-102N shown in FIGS. 1 and 7, user systems 702A-702M or data manager 704 shown in FIG. 7, or any one or more subcomponents thereof shown in FIGS. 9 and 11 may be implemented using computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing nodes 104A-104Z, named caches 106A-106B, regions 108A-108Y, cache items 110A-110P, cache clients 202A-202B, routing layers 204A-204C, Put operation 206, Get operation 208, primary instances of data modules 210A-210C, secondary instances of data modules 302A-302C, replicated instances of data modules 402A-402C, local caches 502A-502B, routing layers 504A-504B, hierarchy scaler 706, nodes 712A-712N, data modules 714A-714N, application(s) 716A-716N, assigning module 902, determination module 904, weight module 906, storing module 908, comparing module 910, assigning module 902', determination module 904', storing module 908', flowchart 800 (including any step of flowchart 800), and/or flowchart 1000 (including any step of flowchart 1000), as described herein.

A user may enter commands and information into the computer 1200 through input devices such as keyboard 1238 and pointing device 1240. Other input devices (not shown) may include a microphone, joystick, game pad, satellite dish, scanner, or the like. These and other input devices are often connected to the processing unit 1202 through a serial port interface 1242 that is coupled to bus 1206, but may be connected by other interfaces, such as a parallel port, game port, or a universal serial bus (USB).

A monitor 1244 or other type of display device is also connected to bus 1206 via an interface, such as a video adapter 1246. In addition to the monitor, computer 1200 may include other peripheral output devices (not shown) such as speakers and printers.

Computer 1200 is connected to a network 1248 (e.g., the Internet) through a network interface or adapter 1250, a modem 1252, or other means for establishing communications over the network. Modem 1252, which may be internal or external, is connected to bus 1206 via serial port interface 1242.

As used herein, the terms "computer program medium" and "computer-readable medium" are used to generally refer to media such as the hard disk associated with hard disk drive 1214, removable magnetic disk 1218, removable optical disk 1222, as well as other media such as flash memory cards, digital video disks, random access memories (RAMs), read only memories (ROM), and the like.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments discussed herein. Accordingly, such computer programs represent controllers of the computer 1200.

Embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system to store instances of data based on hierarchical scale unit values, the system comprising:
   a memory; and
   one or more processors coupled to the memory, the one or more processors configured to:
      determine a failure probability associated with each of a plurality of hierarchical scale units in a distributed store, each failure probability indicating a likelihood of encountering a data failure at the respective hierarchical scale unit;
      access information of a first hierarchical scale unit value associated with a first hierarchical scale unit that is included in the plurality of hierarchical scale units and a second hierarchical scale unit value associated with a second hierarchical scale unit that is included in the plurality of hierarchical scale units, wherein the first and second hierarchical scale unit values are weighted based on the failure probabilities of the first and second hierarchical scale units, respectively;
      establish a primary instance of data with respect to a put operation in the first hierarchical scale unit in accordance with a key value pair associated with the data in response to receipt of a put request that requests performance of the put operation; and
      establish a replicated instance of the data with respect to the put operation in the second hierarchical scale unit in accordance with the key value pair, based on a magnitude of a difference between the weighted first hierarchical scale unit value and the weighted second hierarchical scale unit value being greater than or equal to a threshold and further based on the second hierarchical scale unit having a failure probability that is less than a threshold failure probability, such that the primary instance of the data and the replicated instance of the data are stored across geographic boundaries of respective first and second geographic locations of the respective first and second hierarchical scale units to lower a probability that the data is to become inaccessible as a result of a data failure,
      each hierarchical scale unit value uniquely corresponding to a respective hierarchical scale unit in a hierarchical infrastructure that includes the respective hierarchical scale unit.

2. The system of claim 1, wherein the one or more processors are configured to establish the primary instance of the data with respect to the put operation in the first hierarchical scale unit in response to receipt of the put request, which includes the key value pair.

3. The system of claim 1, wherein the one or more processors are configured to establish the replicated instance of the data with respect to the put operation in the second hierarchical scale unit in accordance with the key value pair in response to the put request, which includes the key value pair, being forwarded from the first hierarchical scale unit to the second hierarchical scale unit.

4. The system of claim 1, wherein the one or more processors are configured to establish the replicated instance of the data with respect to the put operation in the second hierarchical scale unit in accordance with the key value pair by causing the first hierarchical scale unit to forward the put request, which includes the key value pair, to the second hierarchical scale unit.

5. The system of claim 1, wherein the one or more processors are configured to read the data from the first hierarchical scale unit rather than the second hierarchical scale unit with respect to a get operation based on the data stored in the first hierarchical scale unit being the primary instance of the data.

6. The system of claim 5, wherein the one or more processors are configured to read the data from the first hierarchical scale unit rather than the second hierarchical scale unit with respect to the get operation in accordance with a key of the key value pair.

7. The system of claim 1, wherein the one or more processors are configured to access the replicated instance of the data in response to a data failure causing the primary instance of the data to be lost or to become inaccessible.

8. A method, performed by at least one data processor, comprising:
   determining a failure probability associated with each of a plurality of hierarchical scale units in a distributed store, each failure probability indicating a likelihood of encountering a data failure at the respective hierarchical scale unit;
   accessing information of a first hierarchical scale unit value associated with a first hierarchical scale unit that is included in the plurality of hierarchical scale units and a second hierarchical scale unit value associated with a second hierarchical scale unit that is included in the plurality of hierarchical scale units, wherein the first and second hierarchical scale unit values are weighted based on the failure probabilities of the first and second hierarchical scale units, respectively;
   establishing a primary instance of data with respect to a put operation in the first hierarchical scale unit in accordance with a key value pair associated with the data in response to receipt of a put request that requests performance of the put operation; and
   establishing a replicated instance of the data with respect to the put operation in the second hierarchical scale unit in accordance with the key value pair, based on a magnitude of a difference between the weighted first hierarchical scale unit value and the weighted second hierarchical scale unit value being greater than or equal to a threshold and further based on the second hierarchical scale unit having a failure probability that is less than a threshold failure probability, such that the primary instance of the data and the replicated instance of the data are stored across geographic boundaries of respective first and second geographic locations of the respective first and second hierarchical scale units to lower a probability that the data is to become inaccessible as a result of a data failure,
   each hierarchical scale unit value uniquely corresponding to a respective hierarchical scale unit in a hierarchical infrastructure that includes the respective hierarchical scale unit.

9. The method of claim 8, wherein accessing the information comprises:
   establish the primary instance of the data with respect to the put operation in the first hierarchical scale unit in response to receipt of the put request, which includes the key value pair.

10. The method of claim 8, wherein establishing the replicated instance of the data comprises:
    establishing the replicated instance of the data with respect to the put operation in the second hierarchical scale unit in accordance with the key value pair in response to the put request, which includes the key value pair, being forwarded from the first hierarchical scale unit to the second hierarchical scale unit.

11. The method of claim 8, wherein establishing the replicated instance of the data comprises:
    establishing the replicated instance of the data with respect to the put operation in the second hierarchical scale unit in accordance with the key value pair by causing the first hierarchical scale unit to forward the put request, which includes the key value pair, to the second hierarchical scale unit.

12. The method of claim 8, further comprising:
    reading the data from the first hierarchical scale unit rather than the second hierarchical scale unit with respect to a get operation based on the data stored in the first hierarchical scale unit being the primary instance of the data.

13. The method of claim 12, wherein reading the data comprises:
    reading the data from the first hierarchical scale unit rather than the second hierarchical scale unit with respect to the get operation in accordance with a key of the key value pair.

14. The method of claim 8, wherein establishing the primary instance of the data in the first hierarchical scale unit comprises:
    establishing the primary instance of the data in the first hierarchical scale unit in response to the put request being received by a specified hierarchical scale unit of the plurality of hierarchical scale units and further in response to the put request being routed by the specified hierarchical scale unit to the first hierarchical scale unit.

15. The method of claim 14, wherein establishing the primary instance of the data in the first hierarchical scale unit comprises:
    establishing the primary instance of the data in the first hierarchical scale unit in response to the put request being routed by the specified hierarchical scale unit to the first hierarchical scale unit based on a key of the key value pair belonging to the first hierarchical scale unit.

16. The method of claim 8, further comprising:
    reducing a latency associated with accessing the data by accessing the replicated instance of the data rather than the primary instance of the data in response to a request to access the data.

17. A computer program product comprising a computer-readable storage device having computer program logic recorded thereon for enabling a processor-based system to store instances of data based on hierarchical scale unit values by performing operations, the operations comprising:
    determine a failure probability associated with each of a plurality of hierarchical scale units in a distributed store, each failure probability indicating a likelihood of encountering a data failure at the respective hierarchical scale unit;
    access information of a first hierarchical scale unit value associated with a first hierarchical scale unit that is included in the plurality of hierarchical scale units and a second hierarchical scale unit value associated with a second hierarchical scale unit that is included in the plurality of hierarchical scale units, wherein the first and second hierarchical scale unit values are weighted based on the failure probabilities of the first and second hierarchical scale units, respectively;

establish a primary instance of data with respect to a put operation in the first hierarchical scale unit in accordance with a key value pair associated with the data in response to receipt of a put request that requests performance of the put operation; and establish a replicated instance of the data with respect to the put operation in the second hierarchical scale unit in accordance with the key value pair, based on a magnitude of a difference between the weighted first hierarchical scale unit value and the weighted second hierarchical scale unit value being greater than or equal to a threshold and further based on the second hierarchical scale unit having a failure probability that is less than a threshold failure probability, such that the primary instance of the data and the replicated instance of the data are stored across geographic boundaries of respective first and second geographic locations of the respective first and second hierarchical scale units to lower a probability that the data is to become inaccessible as a result of a data failure, each hierarchical scale unit value uniquely corresponding to a respective hierarchical scale unit in a hierarchical infrastructure that includes the respective hierarchical scale unit.

18. The computer program product of claim 17, wherein the operations comprise:

establish the replicated instance of the data in the second hierarchical scale unit with respect to the put operation by causing the put request to be forwarded from the first hierarchical scale unit to the second hierarchical scale unit.

19. The computer program product of claim 17, wherein the operations comprise:

read the data from the first hierarchical scale unit rather than the second hierarchical scale unit with respect to a get operation based on the data stored in the first hierarchical scale unit being the primary instance of the data.

20. The computer program product of claim 17, wherein the operations comprise:

automatically balance a load among the first hierarchical scale unit and the second hierarchical scale unit by accessing the replicated instance of the data in the second hierarchical scale unit rather than the primary instance of the data in the first hierarchical scale unit.

21. The system of claim 1, wherein routing of the put operation is based on a key of the key value pair belonging to a particular hierarchical scale unit.

22. The system of claim 1, wherein the one or more processors are configured to:

establish the replicated instance of the data in the second hierarchical scale unit to lower the probability that the data is to become inaccessible as a result of a data failure by storing the primary instance of the data and the replicated instance of the data in diverse geographic locations.

23. The method of claim 8, wherein establishing the replicated instance of the data in the second hierarchical scale unit comprises:

lowering the probability that the data is to become inaccessible as a result of a data failure by storing the primary instance of the data and the replicated instance of the data in diverse geographic locations.

* * * * *